United States Patent
Kimura et al.

(10) Patent No.: US 7,253,968 B2
(45) Date of Patent: Aug. 7, 2007

(54) OPTICAL PICKUP DEVICE, OPTICAL INFORMATION RECORDING AND REPRODUCING APPARATUS AND OBJECTIVE LENS

(75) Inventors: Tohru Kimura, Hachioji (JP); Nobuyoshi Mori, Hachioji (JP); Kazutaka Noguchi, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 555 days.

(21) Appl. No.: 10/821,940

(22) Filed: Apr. 12, 2004

(65) Prior Publication Data

US 2004/0208110 A1    Oct. 21, 2004

(30) Foreign Application Priority Data

Apr. 15, 2003 (JP) ............................. 2003-110770
Sep. 11, 2003 (JP) ............................. 2003-319517

(51) Int. Cl.
*G02B 13/18* (2006.01)

(52) U.S. Cl. .................. 359/719; 359/717; 369/112.01

(58) Field of Classification Search ................ 359/719, 359/717, 708, 691, 793; 369/44.27, 53.2, 369/53.23, 112.02, 112.03
See application file for complete search history.

(56) References Cited

U.S. PATENT DOCUMENTS

2002/0167739 A1    11/2002    Ota et al.
2003/0002175 A1    1/2003     Kojima

FOREIGN PATENT DOCUMENTS

| EP | 1 067 530 A2 | 1/2001 |
|---|---|---|
| JP | 2001-194581 | 7/2001 |
| JP | 2002-236252 | 8/2002 |
| JP | 2003-006908 | 1/2003 |

OTHER PUBLICATIONS

Search and examination report from Intelloctual Property Office of Singapore.
Search Report from the Austrian Patent Office.

*Primary Examiner*—Timothy Thompson
(74) *Attorney, Agent, or Firm*—Finnegan, Henderson, Farabow, Garrett & Dunner, L.L.P.

(57) ABSTRACT

An optical pickup device comprises a light source to emit a light flux having wavelength $\lambda$; an objective lens including at least two plastic lenses of a first plastic lens having positive refractive power and a second plastic lens having positive refractive power, wherein the first plastic lens and the second plastic lens are arranged in this order from the light source side; and an actuator to drive the objective lens; wherein the objective lens satisfies the following expression (1-1):

$$-0.0004 < \Delta 3SA/(NA^4 \cdot f \cdot (1-m)) < 0.0004 \quad (1\text{-}1)$$

where $\Delta 3SA$ ($\lambda$RMS) represents a rate of change of a third order spherical aberration of the objective lens when the temperature of an entire body of the objective lens uniformly changes, f (mm) represents the focal length of the objective lens for the light flux having wavelength $\lambda$, and m represents the magnification of the objective lens.

25 Claims, 7 Drawing Sheets

OPTICAL PICKUP DEVICE, OPTICAL INFORMATION RECORDING AND REPRODUCING APPARATUS AND OBJECTIVE LENS

BACKGROUND OF THE INVENTION

The present invention relates to an optical pickup device, an optical information recording and reproducing apparatus and an objective lens.

Following upon recent high density of an optical disc, a demand for a smaller light-converged spot makes a numerical aperture (NA) of an objective lens used for recording/reproducing for these high density optical discs to be high.

For example, in the case of a high density optical disc employing a violet semiconductor laser light source having wavelength λ of 405 nm, an objective lens having image-side numerical aperture NA of about 0.85 is needed for achieving high density.

Further, for objective lenses such as CD (compact disc), MO (magneto-optical disc) and DVD (digital video disc), a plastic lens is mainly used for the reasons that the plastic lens is light in weight, and it can be manufactured at low cost on a mass production basis through injection molding that employs a mould. Therefore, even in the case of an optical pickup device for a high density optical disc, it is preferable to use a plastic lens as an objective lens for the same reasons.

However, for realizing an objective lens wherein a high numerical aperture NA of 0.85 has been realized while securing sufficient manufacturing tolerance that allows mass production, it is necessary to use a lens structure of at least two groups, for the reason to divide refracting power to two lenses and thereby to relax manufacturing tolerance for each lens, and there are proposed high NA plastic lenses each being of a two-group structure in, for example, Patent Documents 1 and 2.

(Patent Document 1)
 TOKKAI No. 2002-236252

(Patent Document 2)
 TOKKAI No. 2003-6908

(Problems to be Solved by the Invention)

Incidentally, in the optical pickup device, an objective lens is generally moved by an actuator in the direction of an optical axis and in the radial direction of a disc for conducting focusing and tracking. In this case, an electric current is made to flow through a focusing coil and a tracking coil which institute an actuator, and electromagnetic force thus generated between a magnet and the coil is used to move the objective lens.

However, it was found that a new problem which is not experienced in the conventional structure is caused when the high NA plastic lens with a two-group structure is moved in the aforesaid way. Contents of the problem are as follows; when an electric current is made to flow through a focusing coil and a tracking coil, uneven temperature distribution tends to be caused in the objective lens due to an influence of generation of heat in these coils, because a volume tends to be greater than that of a plastic lens with a one-lens structure which has been used, and in the optical pickup device, on the other hand, temperatures are changed by an influence of environmental temperature and by an influence of heat generation in the focusing coil and the tracking coil.

If a temperature in the optical pickup device is changed under the condition that uneven temperature distribution is caused in the objective lens, spherical aberration of the high NA plastic lens is changed greatly, and recording/reproducing of information for the high density optical disc is obstructed. The reason for the foregoing is that deterioration of spherical aberration caused by temperature is extreme even when compared with a lens wherein temperature distribution is substantially even, and a difference of refractive index further grows greater in proportion to the fourth power of NA, because the refractive index is as great as 10 times in comparison especially with a glass lens.

In particular, the larger an amount of electric current flowing through a focusing coil and a tracking coil is, the larger an amount of heat generation is, resulting in larger unevenness of temperature distribution in an objective lens, thus, a problem of a change (deterioration) of spherical aberration of a high NA plastic lens in the course of operation of the optical pickup device becomes more obvious.

It is difficult, on the point of a mechanism of the actuator, to design and arrange a focusing coil and a tracking coil so that they may be rotational symmetry about an optical axis of the objective lens. Therefore, during operations of the actuator, temperature distribution that is non-rotational-symmetry about an optical axis is caused in the objective lens, resulting in changes of astigmatism of the objective lens. In particular, when the objective lens is made to be a plastic lens of a two-group structure, the refracting power for the ray of light having NA of 0.85 is divided to two lenses, and therefore, a change in a height of passing ray of light in each lens is small, and the lens is easily affected by changes in refractive index following upon the temperature distribution. Therefore, changes of the astigmatism grow great, which adversely affects characteristics of recording/reproducing for optical discs.

However, in the technologies disclosed in the Patent Documents 1 and 2, there is no description of deterioration of spherical aberration and deterioration of astigmatism caused by the change of temperature in the optical pickup device, under the condition that uneven temperature distribution is caused in the objective lens by an influence of heat in the course of driving an actuator as stated above, and any actions for the problem are not taken accordingly, though the aforesaid technologies are those to correct spherical aberration caused by changes in the form of lenses and in refractive index, when temperature of two plastic lenses forming an objective lens is changed evenly.

SUMMARY OF THE INVENTION

An object of the invention is to provide an optical pickup device wherein the aforementioned problem is solved, deterioration of spherical aberration is small, and stable recording/reproducing of information can be conducted for high density discs, even in the case where temperature in the optical pickup device is changed under the condition that uneven temperature distribution is caused in the objective lens that is composed of two plastic lenses. In particular, it is possible to provide an optical pickup device wherein an amount of changes of spherical aberration in the case of changes of temperature in the optical pickup device is small even in the case where an amount of electric current flowing through a focusing coil and a tracking coil is large, and stable recording/reproducing of information for high density optical discs can be conducted accordingly, and to provide an optical information recording and reproducing apparatus employing the aforesaid optical pickup device.

An object of the invention is to provide an optical pickup device wherein the aforementioned problems are taken into consideration, an amount of changes of astigmatism in the case where temperature distribution that is non-rotational-symmetry about an optical axis is caused in the objective lens composed of two plastic lenses is small, and recording/reproducing of information can be conducted stably for high density optical discs, and to provide an optical information recording and reproducing apparatus employing the optical pickup device stated above.

To solve the aforementioned problems, in the first embodiment, the structure described in Item 1-1 is an optical pickup device having therein a light source that emits a light flux having wavelength α, an objective lens composed of at least two plastic lenses including a first plastic lens having positive refracting power and a second plastic lens having positive refracting power, and an actuator that drives the objective lens wherein temperature distribution in the objective lens is changed to be uneven by heat generated when energizing the actuator, and the following expression (1-1) is satisfied by the objective lens when Δ3SA (λRMS) represents a rate of change of the tertiary (third order) spherical aberration of the objective lens, and f (mm) and m respectively represent a focal length of the objective lens for the light flux having wavelength λ and magnification of an optical system.

$$-0.0004 < \Delta 3SA/(NA^4 \cdot f(1-m)) < 0.0004 \tag{1-1}$$

Further, in the second embodiment, the structure described in Item 2-1 is an optical pickup device equipped with an objective lens composed of a light source emitting a light flux having wavelength λ and of at least two of a first plastic lens having positive refractive power and a second plastic lens having positive refractive power, wherein temperature distribution in the objective lens is made to be uneven by heat generated when the actuator is energized, and the following expression (2-1) is satisfied when f (mm) represents a focal length of the objective lens, and $d_1$ (mm) represents a distance between the optical surface on the light source side of the first plastic lens and the optical surface on the optical information recording medium side of the first plastic lens on the optical axis.

$$0.6 < d_1/f < 1.2 \tag{2-1}$$

DETAILED DESCRIPTION OF THE PREFERRED EMBODIMENT

First Embodiment

Incidentally, "uneven temperature distribution" in the present specification will be explained here.

Figure 5:
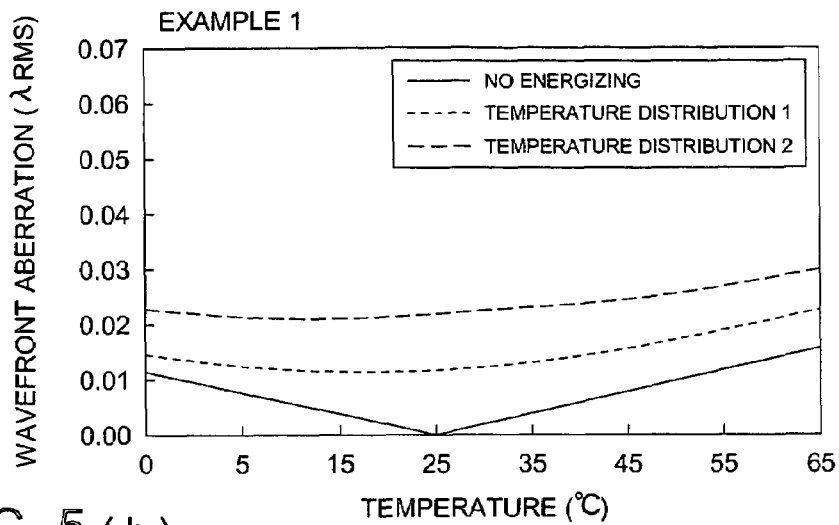
FIG. 5 shows graphs showing temperature characteristics in the case of giving secondary temperature distribution in the radial direction to an objective lens.
Figure 5:
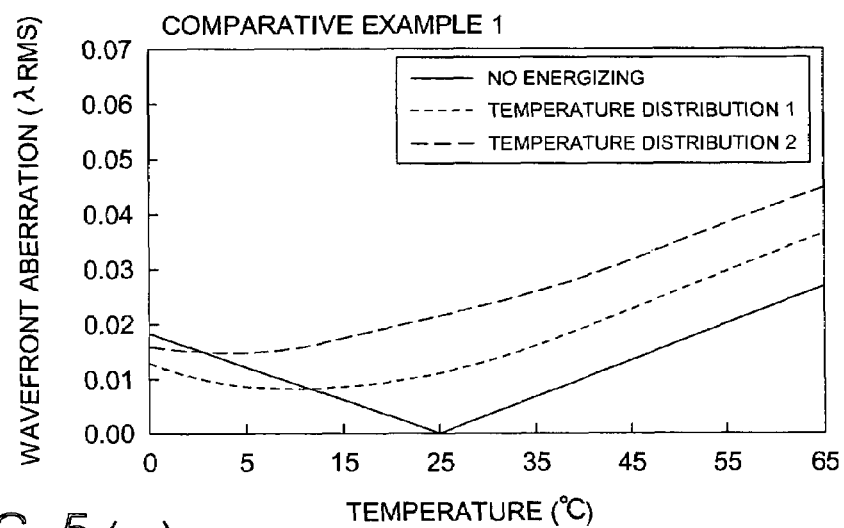
Figure 5:
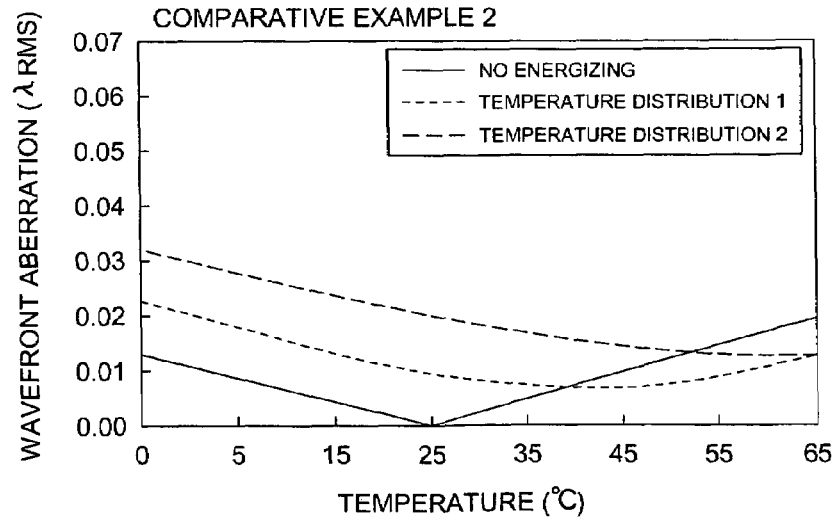
Figure 6A:
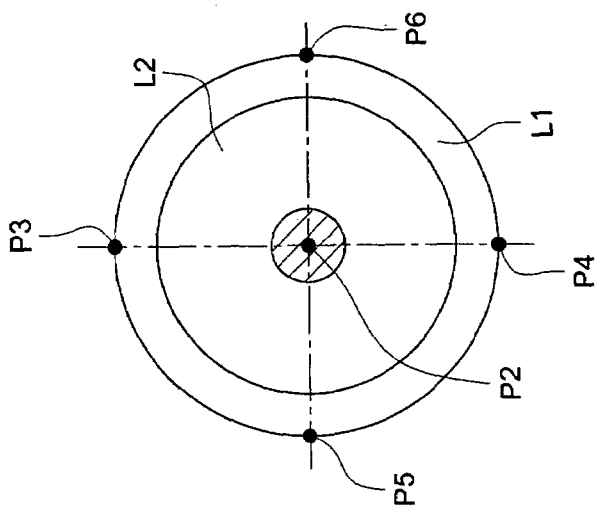
FIG. 6 shows front view (a), side view (b) and rear view (c) all of an objective lens for illustrating "uneven temperature distribution".
Figure 6B:
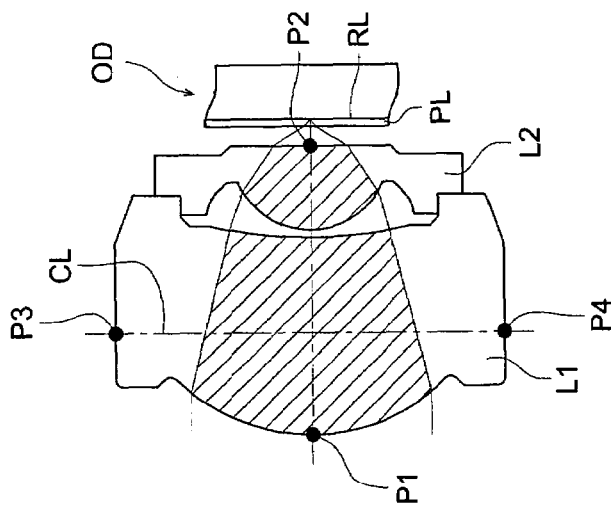
Figure 6C:
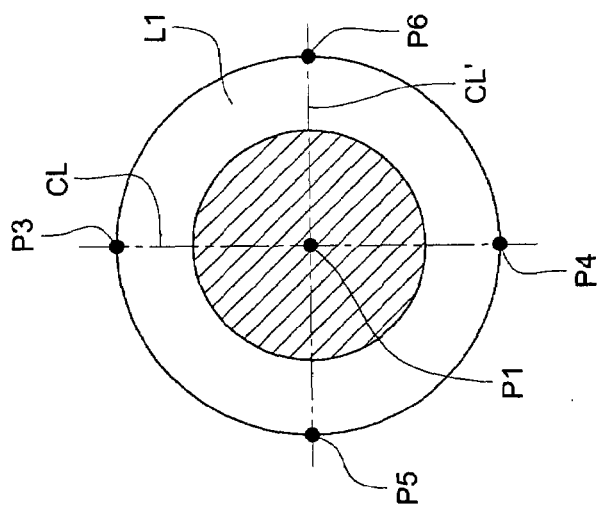

As shown in FIGS. 6(a)-6(c), first plastic lens L1 and second plastic lens L2 both constituting objective lens OBJ have respectively first flange portion FL1 and second flange portion FL2 each being formed solidly with an optical functional portion, on a peripheral portion that is outside the optical functional portion (hatched portion in FIG. 5), and the first plastic lens L1 and the second plastic lens L2 are integrated solidly by joining a part of the first flange portion and a part of the second flange portion (joining portion M in FIG. 6(b)) together.

When driving an actuator (when energizing an actuator), under the assumption that T1 (° C.) represents temperature of vertex P1 of the first surface (an optical surface on the light source side of the first plastic lens L1) in the course of driving an actuator (in the course of energizing the actuator), T2 (° C.) represents temperature of vertex P2 of the fourth surface (an optical surface on the optical disc side of the second plastic lens L2), and T3 (° C.), T4 (° C.), T5 (° C.) and T6 (° C.) represent temperatures respectively at points P3, P4, P5 and P6 where optional line CL that passes through the middle point of a lens thickness (thickness on an optical axis) of the first plastic lens L1 and is perpendicular to the optical axis and line CL' representing the line CL rotated by 90° intersect an outer circumference of the first flange portion FL1, when temperature distribution TA in the optical axis direction and temperature distributions TR1 and TR2 in the radial directions which are defined by $$TA = T1 - T2 (° C.)$$

$$TR1 = (T3 + T4 + T5 + T6)/4 - T1 (° C.)$$

$$TR2 = (T3 + T4 + T5 + T6)/4 - T2 (° C.)$$

satisfy either one of the following three conditions (R1)-(R3), "uneven temperature distribution" is assumed to be caused. Further, T1-T6 are assumed to be measured after the temperature distribution change in the objective lens in the course of energizing the actuator becomes to be in a stationary state.

$$|TA| > 1.0° C. \tag{R1}$$

$$|TR1| > 0.3° C. \tag{R2}$$

$$|TR2| > 0.3° C. \tag{R3}$$

Further, "an occasion where temperature of the total objective lens is changed evenly" means an occasion wherein the temperature distribution TA in the optical axis direction and temperature distributions in the radial directions TR1 and TR2 satisfy all of the three conditions (R1)-(R3).

Further, with regard to "rate of change Δ3SA (λRMS) of the tertiary spherical aberration of the objective lens in the case where temperature of the total objective lens is changed evenly", it is calculated by Δ3SA=(3SA'−3SA)/(55−25) when 3SA (λRMS) represents a tertiary spherical aberration components of wavefront aberration measured under the condition where the change of temperature distribution in the objective lens becomes to be in a stationary state in ambient temperature of 25° C. and 3SA' (λRMS) represents a tertiary spherical aberration components of wavefront aberration measured under the condition where the change of temperature distribution in the objective lens becomes to be in a stationary state in ambient temperature of 55° C.

Incidentally, "change of temperature distribution in the objective lens becomes to be in a stationary state" means that an absolute value of a rate of temperature change is within 0.1° C./min at all measurement points of P1-P6 (see FIG. 6).

Incidentally, with respect to a sign of the tertiary spherical aberration component of wavefront aberration, "+" means an occasion where the correction is excessive (over), while, "−" means an occasion where the correction is insufficient (under).

Further, focal length f (mm) of the objective lens for a light flux having wavelength λ is assumed to be a focal length obtained through measurement under the ambient temperature of 25° C.

Further, the invention can be applied to a high density optical disc as an optical information recording medium, and as a high density optical disc, there are given an optical disc with protective base board thickness of about 0.1 mm employing a violet semiconductor laser light source with wavelength of about 400 nm and an objective lens whose numerical aperture NA is raised to about 0.85, and an optical disc with protective base board thickness of about 0.6 mm employing a violet semiconductor laser light source with wavelength of about 400 nm and an objective lens whose numerical aperture NA is raised to about 0.65.

In the structure described in Item 1-1, by designing the objective lens so that expression (1-1) may be satisfied, it is possible to control deterioration of spherical aberration on an information recording surface of an optical information recording medium in use to be small, and to conduct stable recording/reproducing of information for high density optical discs, even with an optical pickup device employing an objective lens constituted with a plastic lens composed of at least two groups.

Incidentally, it is preferable to design an objective lens so that −0.0003<Δ3SA/(NA4·f (1−m))<0.0003 may be satisfied. In this case, it is possible to control a change (deterioration) to be small for spherical aberration in the case where temperature in an optical pickup device is changed under the condition that a focusing coil and a tracking coil are energized with high-current.

As uneven temperature distribution in an objective lens, there are given, for example, temperature distribution in the optical axis direction, temperature distribution in the radial direction that is rotation-symmetrical about an optical axis, and temperature distribution wherein the aforementioned temperature distributions are combined.

The structure described in Item 1-2 is represented by the optical pickup device described in Item 1-1 wherein the objective lens satisfies the expression (1-1) stated above to control spherical aberration changes in the case where ambient temperature of the optical pickup device is changed in the course of energizing the actuator.

The structure described in Item 1-3 is represented by the optical pickup device described in Item 1-1 or Item 1-2 wherein at least one of |TA|>1.0, |TR1|>0.3 and |TR2|>0.3 is satisfied when TA (° C.) represents temperature distribution in the optical axis direction of the objective lens in the course of energizing the actuator, and each of TR1 (° C.) and TR2 (° C.) represents temperature distribution in the radial direction.

The structure described in Item 1-4 is represented by the optical pickup device described in either one of Item 1-1-Item 1-3 wherein numerical aperture NA on the image side of the objective lens is made to be 0.8 or more.

In the structure described in Item 1-4, the same effect as that in either one of Item 1-1-Item 1-3 can be obtained, and an optical pickup device can be applied properly on a high density optical disc having protective base board thickness of about 0.1 mm employing a violet semiconductor laser light source with wavelength of about 400 nm and an objective lens having numerical aperture NA of about 0.85 on the image side.

The structure described in Item 1-5 is represented by the optical pickup device described in either one of Item 1-1-Item 1-4 wherein the actuator is provided at least with a coil for focusing and a coil for tracking, and at least one of the coil for focusing and the coil for tracking is arranged to be positioned so that its center of gravity may be positioned to be closer to the light source than the center of gravity of the second plastic lens is.

The structure described in Item 1-6 is represented by the optical pickup device described in either one of Item 1-1-Item 1-5 wherein the following expressions (1-2)-(1-4) are satisfied when ΔNL1 represents a rate of change of refractive index of the first plastic lens for temperature changes, ΔNL2 represents a rate of change of refractive index of the second plastic lens for temperature changes, and fB (mm) represents a back focus of the objective lens.

$$-20 \times 10^{-5}/° C. < \Delta NL1 < -2 \times 10^{-5}/° C. \tag{1-2}$$

$$0.6 < \Delta NL2/\Delta NL1 < 1.5 \tag{1-3}$$

$$0.1 < (\Delta NL2/\Delta NL1) \cdot fB/(f \cdot (1-m)) < 0.2 \tag{1-4}$$

In the structure described in Item 1-6, the same effect as that in either one of Item 1-1-Item 1-5 can be obtained, and it is possible to obtain an objective lens satisfying the expression (1-1) by designing the first plastic lens and the second plastic lens so that the rate of change ΔNL1 of refractive index of the first plastic lens for temperature changes and the rate of change ΔNL2 of refractive index of the second plastic lens for temperature changes may satisfy respectively the expression (1-2) and the expression (1-3) and so that back focus fB of the objective lens composed of the first plastic lens and the second plastic lens may satisfy the expression (1-4) for optical magnification m.

The structure described in Item 1-7 is represented by the optical pickup device described in either one of Item 1-1-Item 1-6 wherein the following expression (1-5) is satisfied when f1 (mm) represents a focal length of the first plastic lens for the light flux having wavelength λ, m1 represents an optical system magnification of the first plastic lens, f2 (mm) represents a focal length of the second plastic lens for the light flux having wavelength λ and m2 represents an optical system magnification of the second plastic lens.

$$3.5 < f1 \cdot (1-m1)/(f2 \cdot (1-m)) < 5.8 \tag{1-5}$$

In the structure described in Item 1-7, the same effect as that in either one of Item 1-1-Item 1-6 can be obtained.

The structure described in Item 1-8 is represented by the optical pickup device described in either one of Item 1-1-Item 1-7 wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated solidly by joining a part of the first flange portion and a part of the second flange portion together, and when D1 (mm) represents an outside diameter of the first plastic lens including the first flange portion and D2 (mm) represents an outside diameter of the second plastic lens including the second flange portion, the following expression (1-6) is satisfied and the first plastic lens is held by a bobbin that is driven by the actuator.

$$D1 > D2 \tag{1-6}$$

In the structure described in Item 1-8, the same effect as that in either one of Item 1-1-Item 1-7 can be obtained, and in the so-called objective lens with high NA of a two-group structure that is made by combining two plastic lenses, there is generally a tendency that a volume of the first plastic lens is greater than that of the second plastic lens. Therefore, for improving the precision of driving the objective lens by the actuator, it is preferable to establish the relationship between the first flange portion of the thirst plastic lens and the second flange portion of the second plastic lens so that the expression (1-6) may be satisfied, and to make the thirst plastic lens to be held by the bobbin.

In this case, the first plastic lens is arranged at the position that is closer to the focusing coil and the tracking coil which generate heat when the optical pickup device is operating, which causes troubles that uneven temperature distribution tends to be caused in the objective lens. However, in the optical pickup device of the first embodiment, it is possible to control changes of spherical aberration caused by unevenness of temperature distribution in the objective lens to be small when temperatures in the optical pickup device are changed, because the objective lens is designed so that the expression (1-1) is satisfied, thus, stable recording/reproducing of information can be conducted for high density optical discs.

The optical information recording and reproducing apparatus described in Item 1-9 is equipped with the optical pickup device described in either one of Item 1-1-Item 1-8, and can conduct at least one of recording information on the optical information recording medium and reproducing information recorded on the optical information recording medium.

The structure described in Item 1-10 is an objective lens for an optical pickup device composed of at least two plastic lenses including a first plastic lens having positive refracting power and a second plastic lens having positive refracting power, wherein the objective lens satisfies the following expression (1-1) when $\Delta 3SA$ ($\lambda RMS$) represents a rate of change of the tertiary spherical aberration of the objective lens in the case where temperature of the total objective lens is changed evenly, and f (mm) and m respectively represent a focal length of the objective lens for the light flux having wavelength $\lambda$ and magnification of an optical system, and thereby, a change of spherical aberration in the case where ambient temperature of the optical pickup device is changed is controlled, under the condition that temperature distribution in the objective lens is changed to be uneven by heat generated when energizing the actuator that drives the objective lens.

$$-0.0004 < \Delta 3SA/(NA^4 \cdot f \cdot (1-m)) < 0.0004 \tag{1-1}$$

In the structure described in Item 1-10, by designing the objective lens so that expression (1-1) may be satisfied, it is possible to control deterioration of spherical aberration on an information recording surface of an optical information recording medium in use to be small, and to conduct stable recording/reproducing of information for high density optical discs, even with an optical pickup device employing an objective lens constituted with a plastic lens composed of at least two groups.

The structure described in Item 1-11 is an objective lens described in Item 1-10 wherein the following expression (1-7) is satisfied.

$$-0.0003 < \Delta 3SA/(NA^4 \cdot f \cdot (1-m)) < 0.0003 \tag{1-7}$$

In the structure described in Item 1-11, the same effect as that in Item 1-10 can be obtained, and it is possible to control a change (deterioration) of spherical aberration to be small in the case where temperature in the optical pickup device is changed under the condition that the focusing coil and the tracking coil are energized with high-current.

The structure described in Item 1-12 is represented by the objective lens described in Item 1-10 or Item 1-11 wherein at least one of |TA|>1.0, |TR1|>0.3 and |TR2|>0.3 is satisfied when TA (° C.) represents temperature distribution in the optical axis direction of the objective lens in the course of energizing the actuator, and each of TR1 (° C.) and TR2 (° C.) represents temperature distribution in the radial direction.

The structure described in Item 1-13 is represented by the objective lens described in either one of Item 1-10-Item 1-12 wherein numerical aperture NA on the image side is made to be 0.8 or more.

In the structure described in Item 1-13, the same effect as that in either one of Item 1-10-Item 1-12 can be obtained, and the first embodiment can be used properly for a high density optical disc having protective base board thickness of about 0.1 mm and using a violet semiconductor laser light source with wavelength of about 400 nm and an objective lens having numerical aperture NA of about 0.85 on the image side.

The structure described in Item 1-14 is represented by the objective lens described in either one of Item 1-10-Item 1-13 wherein the following expressions (1-2)-(1-4) are satisfied when $\Delta NL1$ represents a rate of change of refractive index of the first plastic lens for temperature changes, $\Delta NL2$ represents a rate of change of refractive index of the second plastic lens for temperature changes, and fB (mm) represents a back focus of the objective lens.

$$-20 \times 10^{-5}/° C. < \Delta NL1 < -2 \times 10^{-5}/° C. \tag{1-2}$$

$$0.6 < \Delta NL2/\Delta NL1 < 1.5 \tag{1-3}$$

$$0.1 < (\Delta NL2/\Delta NL1) \cdot fB/(f \cdot (1-m)) < 0.2 \tag{1-4}$$

In the structure described in Item 1-14, the same effect as that in either one of Item 1-10-Item 1-13 can be obtained, and it is possible to obtain an objective lens satisfying the aforementioned expression (1-1), by designing the first plastic lens and the second plastic lens so that back focus fB of the objective lens constituted by combining the first plastic lens and the second plastic lens may satisfy the expression (1-4) for optical system magnification m.

The structure described in Item 1-15 is represented by the objective lens wherein the following expressions (1-8)-(1-10) are satisfied.

$$-15 \times 10^{-5}/° C. < \Delta NL1 < -5 \times 10^{-5}/° C. \tag{1-8}$$

$$0.7 < \Delta NL2/\Delta NL1 < 1.4 \tag{1-9}$$

$$0.12 < (\Delta NL2/\Delta NL1) \cdot fB/(f \cdot (1-m)) < 0.18 \tag{1-10}$$

In the structure described in Item 1-15, the same effect as that in Item 1-14 can be obtained, and it is possible to control a change (deterioration) to be small for spherical aberration in the case where temperature in the optical pickup device is changed, even in the case where an amount of energizing for the focusing coil and the tracking coil grows greater.

The structure described in Item 1-16 is represented by the objective lens described in either one of Item 1-10-Item 1-15 wherein the following expression (1-5) is satisfied when f1 (mm) represents a focal length of the first plastic lens for the light flux having wavelength λ, m1 represents an optical system magnification of the first plastic lens, f2 (mm) represents a focal length of the second plastic lens for the light flux having wavelength λ and m2 represents an optical system magnification of the second plastic lens.

$$3.5 < f1 \cdot (1-m1)/(f2 \cdot (1-m)) < 5.8 \quad (1\text{-}5)$$

In the structure described in Item 1-16, the same effect as that in either one of Item 1-10-Item 1-15 can be obtained.

The structure described in Item 1-17 is represented by the objective lens described in either one of Item 1-10-Item 1-16 wherein the second plastic lens is a meniscus that is convex toward the first plastic lens.

In the structure described in Item 1-17, the same effect as that in either one of Item 1-10-Item 1-16 can be obtained, and in the objective lens with high NA of the so-called two-group structure which is composed by combining two plastic lenses, if its form is designed so that the expression (1-4) is satisfied, coma caused on a final surface (an optical surface that is closest to an optical information recording medium) is large in general, when a light flux having a field angle enters the objective lens, which makes a tolerance for positional adjustment of a light source to be severe.

Therefore, by making the form of the second plastic lens to be a meniscus that is convex toward the first plastic lens, occurrence of coma can be reduced and a tolerance for positional adjustment of a light source can be relaxed.

The structure described in Item 1-18 is represented by the objective lens described in either one of Item 1-10-Item 1-17 wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated solidly by joining a part of the first flange portion and a part of the second flange portion together, and when D1 (mm) represents an outside diameter of the first plastic lens including the first flange portion and D2 (mm) represents an outside diameter of the second plastic lens including the second flange portion, the following expression (1-6) is satisfied and the first plastic lens is held by a bobbin that is driven by the actuator.

$$D1 > D2 \quad (1\text{-}6)$$

In the structure described in Item 1-18, the same effect as that in either one of Item 1-10-Item 1-17 can be obtained, and in the so-called objective lens with high NA of a two-group structure that is made by combining two plastic lenses, there is generally a tendency that a volume of the first plastic lens is greater than that of the second plastic lens. Therefore, for improving the precision of driving the objective lens by the actuator, it is preferable to establish the relationship between the first flange portion of the thirst plastic lens and the second flange portion of the second plastic lens so that the expression (1-6) may be satisfied, and to make the thirst plastic lens to be held by the bobbin.

In this case, the first plastic lens is arranged at the position that is closer to the focusing coil and the tracking coil which generate heat when the optical pickup device is operating, which causes troubles that uneven temperature distribution tends to be caused in the objective lens. However, it is possible to control changes of spherical aberration caused by unevenness of temperature distribution in the objective lens to be small when temperatures in the optical pickup device are changed, because the objective lens is designed so that the expression (1-1) is satisfied, thus, stable recording/reproducing of information can be conducted for high density optical discs.

The objective lens, the optical pickup device and the optical information recording and reproducing apparatus in the invention which are applicable to the first and second embodiments will be explained as follows, referring to the drawings.

Figure 1:
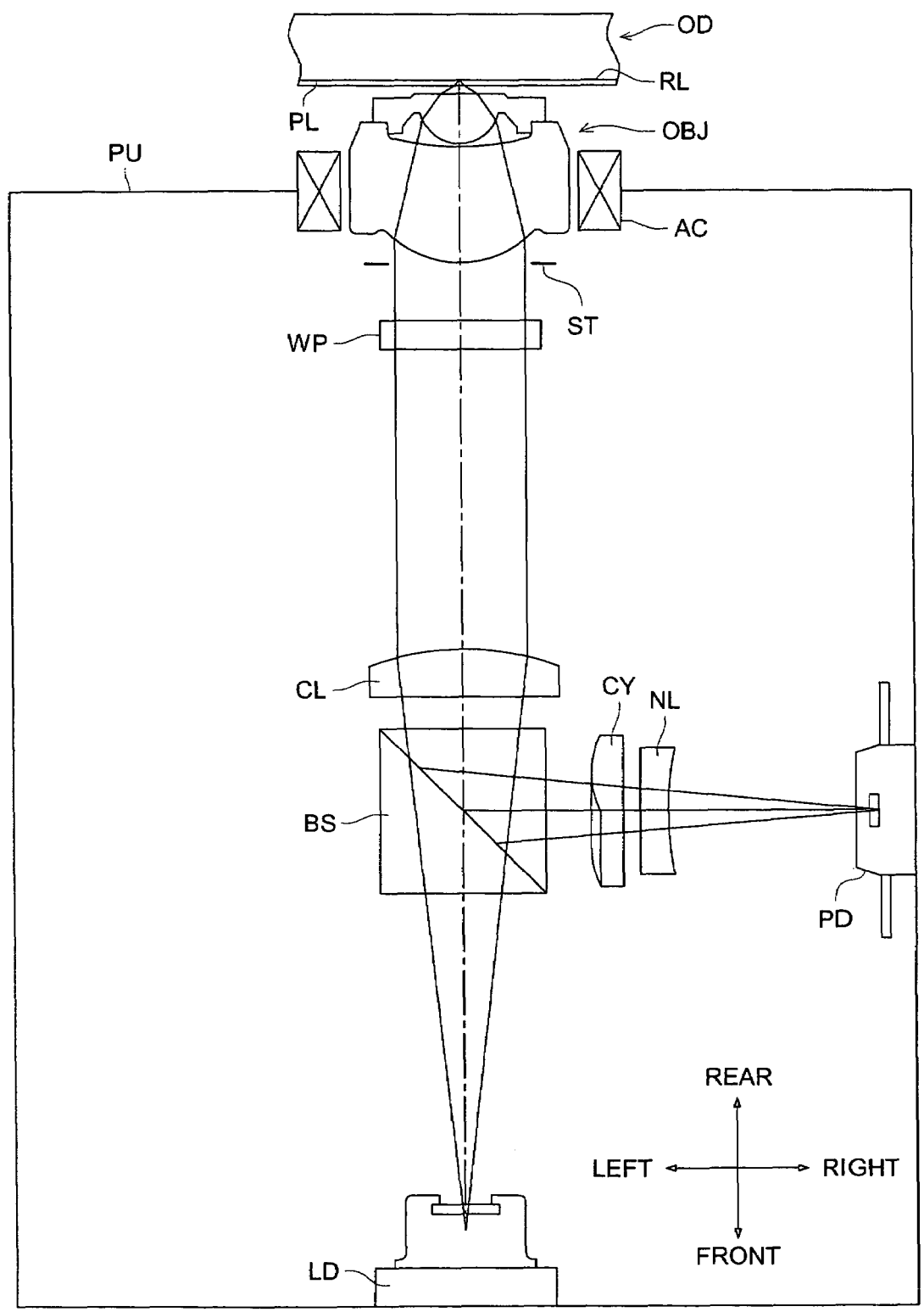
FIG. 1 is a top view of primary portions showing the structure of an optical pickup device.

FIG. 1 is a schematic diagram of optical pickup device PU of the present embodiment, and the optical pickup device PU is composed of violet semiconductor laser LD representing a light source emitting a light flux with wavelength λ, polarized beam splitter BS, collimator CL, ¼ wavelength plate WP, diaphragm ST, objective lens OBJ, biaxial actuator AC, cylindrical lens CY, concave lens NL, and photo-detector PD. Incidentally, in the following explanation, the direction running parallel with the optical axis direction toward a light source is sometimes expressed as "front" for convenience' sake, and the direction toward an optical information recording medium is expressed as "the rear".

A divergent light flux with wavelength λ emitted from the violet semiconductor laser LD is transmitted through the polarized beam splitter BS, and after becoming a circularly polarized collimated light flux through the collimator lens CL and ¼ wavelength plate WP, a diameter of the light flux is regulated by the diaphragm ST, and the light flux becomes a spot formed by the objective lens OBJ on information recording surface RL through protective layer PL of high density optical disc OD.

A reflected light flux modulated by information pits on the information recording surface RL passes through the objective lens OBJ, the diaphragm ST, ¼ wavelength plate WP and collimator lens CL again to become a converged light flux, then, reflected by the polarized beam splitter BS, and passes through the cylindrical lens CY and concave lens NL to be given astigmatism, and is converged on the photo-detector PD. Thus, information recorded on optical disc OD can be read by the use of output signals of the photo-detector PD.

Figure 2:
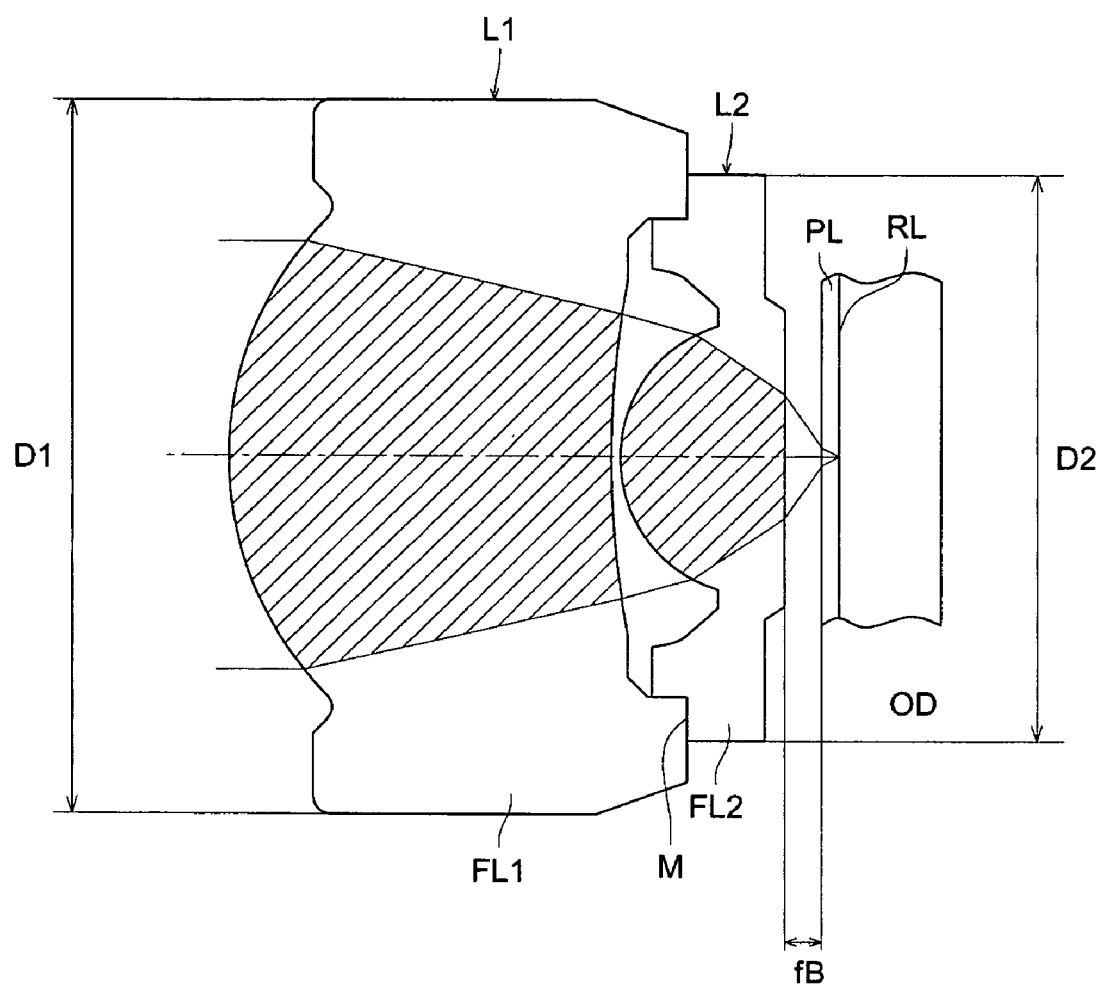
FIG. 2 is a side view of primary portions showing the structure of an objective lens.

As shown in FIG. 2, the objective lens OBJ has a function to converge a laser beam emitted from the violet semiconductor laser LD on information recording surface RL of high density optical disc OD through its protective layer PL.

The objective lens OBJ is a plastic lens of a two-group structure type composed of first plastic lens L1 having positive power (refracting power) arranged to be closer to the violet semiconductor laser LD and second plastic lens L2 having positive power arranged to be closer to high density optical disc OD, and image-side numerical aperture NA obtained by combining the aforementioned two plastic lenses is 0.85.

Incidentally, as objective lens OBJ used in the first embodiment, it has only to be of a plastic lens structure with at least two groups, and it is not limited to the structure with only two groups shown in the present embodiment.

Further, first plastic lens L1 and second plastic lens L2 both have respectively first flange portion FL1 and second flange portion FL2 each being formed solidly with an optical functional portion, on a peripheral portion rather than the optical functional portion (hatched portion in FIG. 2), and the first plastic lens L1 and the second plastic lens L2 are integrated solidly by joining a part of the first flange portion FL1 and a part of the second flange portion FL2 (joining portion M in FIG. 2(*b*)) together.

Outside diameter D1 (mm) of the first plastic lens L1 including the first flange portion FL1 is greater than outside diameter D2 (mm) of the second plastic lens L2 including the second flange portion FL2, to satisfy the expression (1-6) mentioned above.

Due to this, a volume of the first plastic lens L1 arranged to be closer to the light source is greater than that of the second plastic lens L2, and driving accuracy (positioning accuracy) by actuator AC for objective lens OBJ that is in the state of being held by bobbin B can be improved, as stated later.

FIGS. 3(a) and 3(b) are detailed drawings in the vicinity of objective lens OBJ.

The objective lens OBJ is held by bobbin B driven by biaxial actuator AC when the first flange portion FL1 of the first plastic lens L1 touches. Incidentally, explanation of operations of the biaxial actuator AC will be omitted here because they are known widely. Further, the symbol MG represents a magnet.

In general, from the viewpoint of securing a working distance of objective lens OBJ, focusing coil FC and tracking coil TC are arranged to be front of the rear end of objective lens OBJ (plane of emergence of the second plastic lens L2 in the present embodiment) in many cases, and the center of gravity GC of the focusing coil is positioned at a point in the vicinity of the center of a length of that coil in its longitudinal direction, and the center of gravity GC' of the tracking coil is positioned at a point in the vicinity of the center of a length of that coil in its longitudinal direction.

Therefore, center of gravity positions GC and GC' respectively of the focusing coil FC and the tracking coil TC are positioned to be closer than the center of gravity position GL2 of the second plastic lens L2 to violet semiconductor laser LD.

In the course of operations of optical pickup device PU, temperature of objective lens OBJ rises under an influence of heat generated from the focusing coil FC and the tracking coil TC, and temperature on the peripheral portion on the plane of incidence of the first plastic lens L1 becomes higher than temperature in the vicinity of an optical axis on the plane of emergence of the second plastic lens L2, because the focusing coil FC and the tracking coil TC are arranged to be front of the second plastic lens L2, thus, uneven temperature distribution is caused in the objective lens OBJ.

However, in the optical pickup device PU relating to the first embodiment, even when temperature in the optical pickup device PU is changed under the condition that uneven temperature distribution is caused in the objective lens OBJ, changes in spherical aberration can be controlled to be small, because the objective lens OBJ is designed to satisfy the expression (1-1), thus, stable recording/reproducing of information can be conducted for high density optical disc OD.

Specifically, it is possible to design an objective lens satisfying the expression (1-1) by designing objective lens OBJ so that the expressions (1-2)-(1-4) may be satisfied, when assuming that $\Delta NL1$ represents a rate of change of the refractive index for temperature change of the first plastic lens L1, $\Delta NL2$ represents a rate of change of the refractive index for temperature change of the second plastic lens L2 and fM (mm) represents a back focus.

Incidentally, it is preferable to design objective lens OBJ so that the expression (1-5) may be satisfied when assuming that f1 (mm) represents a focal length of the first plastic lens L1 for a light flux with wavelength $\lambda$, m1 represents optical system magnification of the first plastic lens L1, f2 (mm) represents a focal length of the second plastic lens L2 for a light flux with wavelength $\lambda$ and m2 represents optical system magnification of the second plastic lens L2.

Further, it is preferable to design objective lens OBJ so that $-0.0003 < \Delta 3SA/(NA4 \cdot f \cdot (1-m)) < 0.0003$ (expression (1-7)) may be satisfied, and to design so that $-15 \times 10^{-5}/°C. < \Delta NL1 < -5 \times 10^{-5}/°C.$ (expression (1-8)), $0.7 < \Delta NL2/\Delta NL1 < 1.4$ (expression (1-9)) and $0.12 < (\Delta NL2/\Delta NL1) \cdot fB/(f \cdot (1-m)) < 0.18$ (expression (1-10)) may be satisfied. In this case, it is possible to control changes in spherical aberration to be small even in the case where an amount of energizing of actuator AC is increased and an amount of heat generated from the actuator is increased.

In the objective lens in the present embodiment, the second plastic lens L2 is a meniscus that is convex toward the first plastic lens L1. In general, in the objective lens made of plastic having high NA of a two-group structure, if its form is designed so that the expression (1-4) is satisfied, coma caused on a final surface (an optical surface that is closest to an optical information recording medium) is large, in general, when a light flux having a field angle enters the objective lens, which makes a tolerance for positional adjustment of a light source to be severe. However, by making a form of the second plastic lens L2 to be a meniscus that is convex toward the first plastic lens L1, occurrence of the coma can be reduced and tolerance for positional adjustment for the light source can be relaxed.

Further, it is possible to obtain an optical information recording and reproducing apparatus which is provided with the optical pickup device PU, a rotary driving device that holds optical information recording medium OD rotatably and a control device that controls driving of the various devices stated above, and conducts at least one of recording of information for optical information recording medium OD and reproducing of information recorded on optical information recording medium OD.

Next, a specific example (Example) of the objective lens appropriate as the objective lens OBJ mentioned above will be explained by comparing it with a comparative example.

Lens data of a plastic lens with NA of 0.85 designed so that a value of the expression (1-1) may be zero are shown in Table 1-1 as Example 1-1, lens data of a plastic lens with NA of 0.85 designed so that a value of $\Delta 3SA/(NA^4 \cdot f \cdot (1-m))$ may be 0.0004, namely the expression (1-1) may not be satisfied, are shown in Table 1-2 as Comparative Example 1-1, and lens data of a plastic lens with NA of 0.85 designed so that a value of $\Delta 3SA/(NA^4 \cdot f \cdot (1-m))$ may be $-0.0004$, namely, the expression (1-1) may not be satisfied, are shown in Table 1-3 as Comparative Example 1-2.

TABLE 1-1

NA = 0.85, $\lambda$ = 405 nm, f = 1.765 mm, m = 0

Paraxial data

| Surface No. | r (mm) | d (mm) | N$\lambda$ | vd | Remarks |
|---|---|---|---|---|---|
| 0 | — | ∞ | — | — | Light source |
| 1 | 2.14544 | 2.45000 | 1.52469 | 56.5 | First plastic lens |
| 2 | 8.08503 | 0.05000 | | | |
| 3 | 0.86617 | 1.10000 | 1.52469 | 56.5 | Second plastic lens |
| 4 | ∞ | 0.26984 | | | |
| 5 | ∞ | 0.10000 | 1.61950 | 30.0 | Protective layer |
| 6 | ∞ | — | — | — | |

TABLE 1-1-continued

NA = 0.85, λ = 405 nm, f = 1.765 mm, m = 0

Aspheric surface coefficient

| | First surface | Second surface | Third surface |
|---|---|---|---|
| κ | −0.253147 | 18.319342 | −0.777817 |
| A4 | −0.387420E−02 | −0.532954E−03 | 0.126463E−00 |
| A6 | 0.213490E−02 | 0.973058E−03 | 0.988215E−02 |
| A8 | −0.235275E−02 | 0.117802E−01 | 0.178879E−00 |
| A10 | 0.959593E−03 | −0.273116E−01 | −0.928546E−01 |
| A12 | −0.276243E−03 | 0.101605E−01 | 0 |
| A14 | 0.476237E−04 | 0 | 0 |
| A16 | −0.122362E−04 | 0 | 0 |

TABLE 1-2

NA = 0.85, λ = 405 nm, f = 1.765 mm, m = 0

Paraxial data

| Surface No. | r (mm) | d (mm) | Nλ | νd | Remarks |
|---|---|---|---|---|---|
| 0 | — | ∞ | — | — | Light source |
| 1 | 2.23319 | 2.45000 | 1.52469 | 56.5 | First |
| 2 | 11.05425 | 0.05000 | | | plastic lens |
| 3 | 0.88915 | 1.10000 | 1.52469 | 56.5 | Second |
| 4 | ∞ | 0.29705 | | | plastic lens |
| 5 | ∞ | 0.10000 | 1.61950 | 30.0 | Protective |
| 6 | ∞ | — | — | — | layer |

Aspheric surface coefficient

| | First surface | Second surface | Third surface |
|---|---|---|---|
| κ | −0.284027 | −10.315724 | −0.802652 |
| A4 | −0.536749E−02 | −0.514298E−02 | 0.123184E−00 |
| A6 | 0.241820E−02 | 0.273672E−02 | 0.172605E−02 |
| A8 | −0.238797E−02 | 0.146219E−01 | 0.154421E−00 |
| A10 | 0.954259E−03 | −0.254496E−01 | −0.798437E−01 |
| A12 | −0.268115E−03 | 0.850195E−02 | 0 |
| A14 | 0.481111E−04 | 0 | 0 |
| A16 | −0.141790E−04 | 0 | 0 |

TABLE 1-3

NA = 0.85, λ = 405 nm, f = 1.765 mm, m = 0

Paraxial data

| Surface No. | r (mm) | d (mm) | Nλ | νd | Remarks |
|---|---|---|---|---|---|
| 0 | — | ∞ | — | — | Light source |
| 1 | 2.04533 | 2.45000 | 1.52469 | 56.5 | First |
| 2 | 7.41179 | 0.05000 | | | plastic lens |
| 3 | 0.86077 | 1.10000 | 1.52469 | 56.5 | Second |
| 4 | ∞ | 0.23512 | | | plastic lens |
| 5 | ∞ | 0.10000 | 1.61950 | 30.0 | Protective |
| 6 | ∞ | — | — | — | layer |

Aspheric surface coefficient

| | First surface | Second surface | Third surface |
|---|---|---|---|
| κ | −0.242730 | 22.889161 | −0.759406 |
| A4 | −0.382647E−02 | 0.459846E−02 | 0.131962E−00 |
| A6 | 0.223673E−02 | 0.249760E−02 | 0.169630E−01 |
| A8 | −0.232367E−02 | 0.814558E−02 | 0.186854E−00 |
| A10 | 0.953693E−03 | −0.317463E−01 | −0.950598E−01 |
| A12 | −0.276669E−03 | 0.132669E−01 | 0 |
| A14 | 0.396269E−04 | 0 | 0 |
| A16 | −0.942655E−05 | 0 | 0 |

For any plastic lens, focal length f for wavelength λ (405 nm) is 1.765 mm, optical system magnification m is 0, each of rate of change ΔNL1 of the refractive index of the first plastic lens L1 for temperature changes and rate of change ΔNL2 of the refractive index of the second plastic lens L2 for temperature changes is $-11 \times 10^{-5}/°$ C., outside diameter D1 of the first plastic lens L1 including first flange portion FL1 is 4.8 mm and outside diameter D2 of the second plastic lens L2 including second flange portion FL2 is 3.8 mm.

In lens data shown in Table 1-1 - Table 1-3, NA represents a numerical aperture, λ (nm) is a design wavelength, f (mm) represents a focal length, m represents an optical system magnification, r (mm) represents a radius of curvature, d (mm) represents a distance between surfaces, Nλ represents a refractive index in the design wavelength, and νd represents Abbe's number in d line, and an aspheric surface is expressed by the following Numeral 1 when X (mm) represents an amount of deformation from a plane that is tangent to the aspheric surface at its vertex, h (mm) represents a height in the direction perpendicular to the optical axis and r (mm) represents a radius of curvature, wherein κ represents a conic constant and $A_{2i}$ represents an aspheric surface coefficient.

Further, in Example 1, focal length f1 (mm) of the first plastic lens L1 for a light flux having wavelength λ is 4.87 mm, optical system magnification m1 of the first plastic lens L1 is 0, focal length f2 (mm) of the second plastic lens L2 for a light flux having wavelength λ is 1.65 mm, and optical system magnification m2 of the second plastic lens L2 is 0.37. Similarly, in Comparative Example 1, focal length f1 (mm) is 4.87 mm, optical system magnification m1 is 0, focal length f2 (mm) is 1.70 mm, and optical system magnification m2 is 0.35, and in Comparative Example 2, focal length f1 (mm) is 4.65 mm, optical system magnification m1 is 0, focal length f2 (mm) is 1.64 mm, and optical system magnification m2 is 0.36.

$$X = \frac{h^2/r}{1 + \sqrt{1 - (1+\kappa)h^2/r^2}} + \sum_{i=0}^{8} A_{2i} h^{2i} \qquad \text{(Numeral 1)}$$

Figure 4:
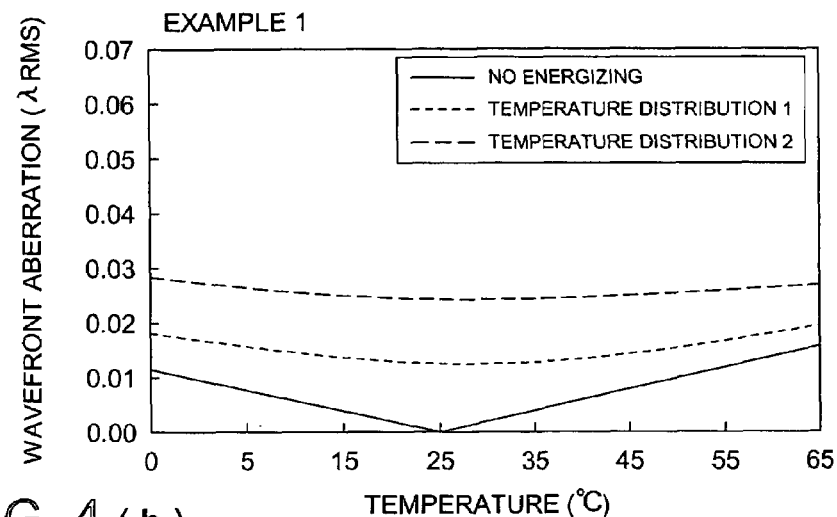
FIG. 4 shows graphs showing temperature characteristics in the case of giving a linear temperature distribution in the optical axis direction to an objective lens.
Figure 4:
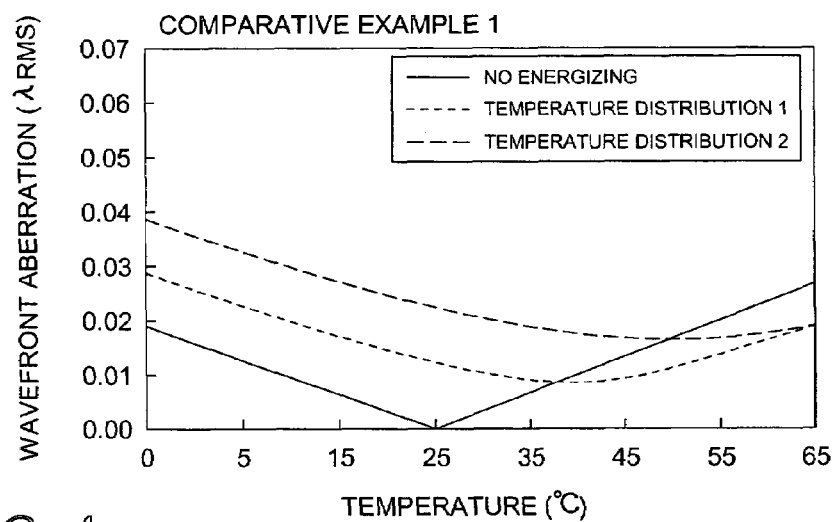
Figure 4:
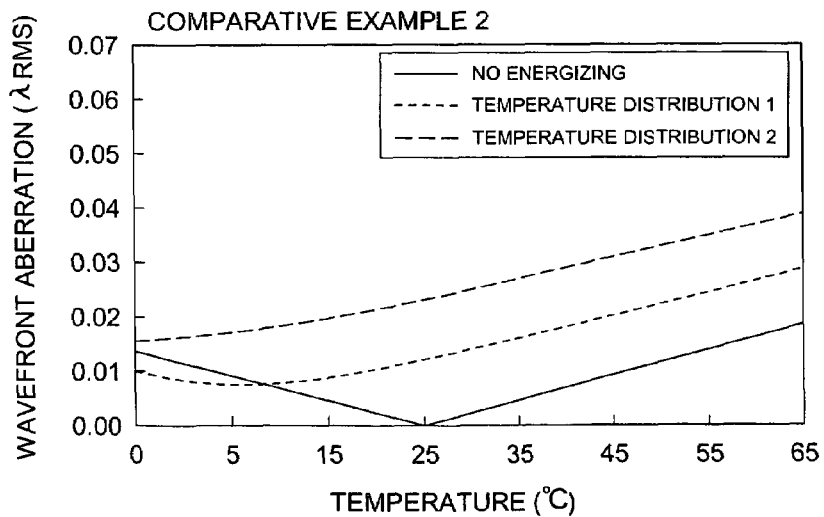

In the plastic lens, occurrence of temperature distribution in the lens is equivalent to occurrence of refractive index distribution in the lens. FIG. 4 shows results obtained through simulation of temperature characteristics wherein refractive index distribution corresponding to temperature distribution in the optical axis direction caused in objective lens OBJ by heat generated in focusing coil FC and tracking coil TC is given to a plastic lens of each of Example 1 and Comparative Examples 1 and 2. In this simulation, a linear temperature distribution wherein temperature falls gradually in the direction from the light source side to the optical disc side is assumed as a model of temperature distribution in the optical axis direction, and with respect to the axis of abscissas in FIG. 4, temperature at a vertex (P2 in FIG. 6) of the optical surface on the optical disc side of the second plastic lens L2 is T2.

In FIG. 4, "no energizing" corresponds to an occasion where uneven temperature distribution is not caused in objective lens OBJ, and temperature of the total objective lens OBJ rises evenly. Therefore, values of the temperature distribution TA in the optical axis direction and of the temperature distributions TR1 and TR2 in the radial directions are all zero, and none of the aforementioned three conditions (R1)-(R3) is satisfied.

Further, "temperature distribution 1" corresponds to an occasion wherein temperature falls by 1° C. for a length of 1 mm from the light source side to the optical disc side. Since the lens thickness on the optical axis in Example 1-1 and in Comparative Examples 1-1 and 1-2 excluding an air distance of 0.05 mm between the first plastic lens L1 and the second plastic lens L2 is 3.55 mm, temperature difference TA between temperature at a vertex (P1 in FIG. 6) of the optical surface on the light source side of the first plastic lens L1 and temperature at a vertex (P2 in FIG. 6) of the optical surface on the optical disc side of the second plastic lens L2 is 3.55. Therefore, the refractive index at P1 is lower than that at P2 by $39.05 \times 10^{-5}$. Incidentally, values of temperature distribution TA in the optical axis direction in "temperature distribution 1" and of temperature distributions in the radial directions TR1 and TR1 are respectively 3.55, 1.225 and 2.325.

Further, "temperature distribution 2" corresponds to an occasion wherein temperature falls by 2° C. for a length of 1 mm from the light source side to the optical disc side, and temperature difference TA between temperature at a vertex P1 of the optical surface on the light source side of the first plastic lens L1 and temperature at a vertex P2 of the optical surface on the optical disc side of the second plastic lens L2 is 7.10. Therefore, the refractive index at P1 is lower than that at P2 by $78.1 \times 10^{-5}$. Incidentally, values of temperature distribution TA in the optical axis direction at "temperature distribution 2" and of temperature distributions in the radial directions TR1 and TR2 are respectively 7.10, 2.45 and 4.65.

On the other hand, FIG. 5 shows results obtained through simulation of temperature characteristics wherein refractive index distribution corresponding to temperature distribution in the radial direction caused in objective lens OBJ by heat generated in focusing coil FC and tracking coil TC is given to a plastic lens of each of Example 1-1 and Comparative Examples 1-1 and 1-2. In this simulation, secondary temperature distribution in the radial direction wherein temperature rises gradually in the direction from the optical axis to the peripheral portion (which is rotational symmetry about an optical axis) is assumed as a model of temperature distribution in the optical axis direction, and the axis of abscissas in FIG. 5 represents temperature on the optical axis of the objective lens.

In FIG. 5, "no energizing" corresponds to an occasion where no uneven temperature distribution is not caused in objective lens OBJ, and temperature of the total objective lens OBJ rises evenly. Therefore, values of the temperature distribution TA in the optical axis direction and of the temperature distributions TR1 and TR2 in the radial directions are all zero, and none of the aforementioned three conditions (R1)-(R3) is satisfied.

Further, "temperature distribution 1" corresponds to an occasion wherein the secondary coefficient of temperature distribution in the radial direction is $-3.82 \times 10^{-5}$, and this corresponds to an occasion wherein temperature on the outermost position (position at diameter 4.8) of the first plastic lens L1 including first flange portion FL1 is higher than temperature on the optical axis by 2° C. Namely, the refractive index at each of P3-P6 (see FIG. 6) is lower than that in each of P1 and P2 by $22.0 \times 10^{-5}$. Incidentally, values of the temperature distribution TA in the optical axis direction and of the temperature distributions TR1 and TR2 in the radial directions are respectively 0, 2 and 2, and all of the aforementioned three conditions (R1)-(R3) are satisfied.

Further, "temperature distribution 2" corresponds to an occasion wherein the secondary coefficient of temperature distribution in the radial direction is $-7.64 \times 10^{-5}$, and this corresponds to an occasion wherein temperature on the outermost position (position at diameter 4.8) of the first plastic lens L1 including first flange portion FL1 is higher than temperature on the optical axis by 4° C. Namely, the refractive index at each of P3-P6 is lower than that in each of P1 and P2 by $44.0 \times 10^{-5}$. Incidentally, values of the temperature distribution TA in the optical axis direction and of the temperature distributions TR1 and TR2 in the radial directions are respectively 0, 4 and 4, and all of the aforementioned three conditions (R1)-(R3) are satisfied.

In this case, there is assumed an occasion wherein an ambient temperature of optical pickup device PU is 25° C. at the start of recording/reproducing in optical pickup device PU equipped with the objective lens OBJ in Example 1-1 and in Comparative Example 1-2 (therefore, temperature at vertex P2 on the optical surface on the optical disc side of the second plastic lens L2 is 25° C., and temperature distribution TA in the optical axis is zero), and temperature on vertex P2 on the optical surface on the optical disc side of the second plastic lens L2 at completion of recording/reproducing is 65° C., following upon a rise in ambient temperature for the optical pickup device PU, and temperature distribution in the optical axis direction given by "temperature distribution 2" in FIG. 4 is caused in objective lens OBJ by an influence of heat generation of actuator AC.

It is understood, from FIG. 4(c), that an amount of change of wavefront aberration at completion of recording/reproducing for that at the start of recording/reproducing is about 0.04 ΔRMS in the objective lens in Comparative Example 2 that does not satisfy expression (1-1), and understood, from FIG. 4(a), that an amount of change of wavefront aberration at completion of recording/reproducing for that at the start of recording/reproducing is controlled to be as small as about 0.03 ΔRMS or less in the objective lens OBJ in Example 1 that satisfies expression (1-1).

Further, there is assumed an occasion wherein an ambient temperature of optical pickup device PU is 25° C. at the start of recording/reproducing in optical pickup device PU equipped with the objective lens in Example 1 and in Comparative Example 1 (therefore, temperature on the optical axis of the objective lens is 25° C., and temperature distributions in the radial direction TR1 and TR2 are zero), and temperature on the optical axis of objective lens is 65° C., following upon a rise in ambient temperature for the optical pickup device PU, and temperature distribution in the radial direction given by "temperature distribution 2" in FIG. 5 is caused in the objective lens by an influence of heat generation of actuator AC.

It is understood, from FIG. 5(b), that an amount of change of wavefront aberration at completion of recording/reproducing for that at the start of recording/reproducing is about 0.04 ΔRMS in the objective lens in Comparative Example 1 that does not satisfy expression (1-1), and understood, from FIG. 5(a), that an amount of change of wavefront aberration at completion of recording/reproducing for that at the start of recording/reproducing is controlled to be as small as about 0.03 ΔRMS or less in the objective lens OBJ in Example 1 that satisfies expression (1-1).

As stated above, in the objective lens OBJ in Example 1, it is understood that a change of spherical aberration is controlled to be small, and there are provided sufficient functions as an objective lens used in an optical pickup device for a high density optical disc for which an allowable range for wavefront aberration of objective lens OBJ is severe, even in the case where ambient temperature for optical pickup device PU is changed under the condition that uneven temperature distribution in the objective lens OBJ is caused by an influence of heat generation of actuator AC.

Incidentally, in the objective lenses in Example 1 and Comparative Examples 1 and 2, only changes in refractive index caused by temperature distribution and temperature changes were taken into consideration, when calculating Δ3SA in expression (1-1).

Next, specific two examples of the objective lens suitable for the aforementioned objective lens OBJ will be presented. An objective lens in Example 2 whose lens data are shown in Table 1-4 is a plastic lens having NA of 0.85 that is designed sot that a value of $\Delta 3SA/(NA^4 \cdot f \cdot (1-m))$ may be −0.0002, and its focal length f for wavelength λ (405 nm) is 1.765 mm, optical system magnification m is 0, rate of change ΔNL1 of refractive index of first plastic lens L1 for temperature changes is $-11 \times 10^{-5}$/° C., rate of change ΔNL2 of refractive index of second plastic lens L2 for temperature changes $-9 \times 10^{-5}$/° C., outside diameter D1 of first plastic lens L1 including first flange portion FL1 is 4.8 mm and outside diameter D2 of second plastic lens L2 including second flange portion L2 is 3.8 mm.

TABLE 1-4

NA = 0.85, λ = 405 nm, f = 1.765 mm, m = 0

Paraxial data

| Surface No. | r (mm) | d (mm) | Nλ | vd | Remarks |
|---|---|---|---|---|---|
| 0 | — | ∞ | — | — | Light source |
| 1 | 2.23667 | 2.50000 | 1.52469 | 56.5 | First plastic lens |
| 2 | 6.62678 | 0.05000 | | | |
| 3 | 0.88192 | 1.10000 | 1.56013 | 56.0 | Second plastic lens |
| 4 | 27.61914 | 0.29757 | | | |
| 5 | ∞ | 0.10000 | 1.61950 | 30.0 | Protective layer |
| 6 | ∞ | — | — | — | |

Aspheric surface coefficient

| | First surface | Second surface | Third surface |
|---|---|---|---|
| κ | −0.157134 | −1.033298 | −0.821555 |
| A4 | −0.461875E−02 | −0.617302E−02 | 0.112611E+00 |
| A6 | 0.945798E−03 | 0.168099E−01 | 0.417206E−01 |
| A8 | −0.129177E−02 | −0.570907E−02 | 0.911378E−01 |
| A10 | 0.370796E−03 | −0.162041E−01 | −0.401250E−01 |
| A12 | −0.863413E−04 | 0.740067E−02 | 0 |
| A14 | 0.315790E−05 | 0 | 0 |
| A16 | −0.591123E−05 | 0 | 0 |

Further, objective lens OBJ in Example 1-3 whose lens data are shown in Table 1-5 is a plastic lens having NA of 0.85 that is designed so that a value of $\Delta 3SA/(NA^4 \cdot f \cdot (1-m))$ may be −0.0001, and its focal length f for wavelength λ (405 nm) is 1.765 mm, optical system magnification m is −0.089, rate of change ΔNL1 of refractive index of first plastic lens L1 for temperature changes is $-11 \times 10^{-5}$/° C., rate of change ΔNL2 of refractive index of second plastic lens L2 for temperature changes is $-9 \times 10^{-5}$/° C., outside diameter D1 of first plastic lens L1 including first flange portion FL1 is 4.8 mm and outside diameter D2 of second plastic lens L2 including second flange portion FL2 is 3.8 mm.

TABLE 1-5

NA = 0.85, λ = 405 nm, f = 1.765 mm, m = −0.089

Paraxial data

| Surface No. | r (mm) | d (mm) | Nλ | vd | Remarks |
|---|---|---|---|---|---|
| 0 | — | 20.00000 | — | — | Light source |
| 1 | 1.90447 | 2.50000 | 1.52469 | 56.5 | First plastic lens |
| 2 | 15.76058 | 0.05000 | | | |

TABLE 1-5-continued

NA = 0.85, λ = 405 nm, f = 1.765 mm, m = −0.089

| 3 | 0.96921 | 1.10000 | 1.56013 | 56.0 | Second plastic lens |
|---|---|---|---|---|---|
| 4 | ∞ | 0.33479 | | | |
| 5 | ∞ | 0.10000 | 1.61950 | 30.0 | Protective layer |
| 6 | ∞ | — | — | — | |

Aspheric surface coefficient

| | First surface | Second surface | Third surface |
|---|---|---|---|
| κ | −0.091995 | 19.909808 | −0.891431 |
| A4 | −0.824904E−02 | 0.264456E−01 | 0.101555E+00 |
| A6 | 0.281942E−04 | −0.138684E−01 | 0.293358E−02 |
| A8 | −0.194862E−02 | 0.248894E−01 | 0.828845E−01 |
| A10 | 0.778565E−03 | −0.274969E−01 | −0.514588E−01 |
| A12 | −0.327089E−03 | 0.779188E−02 | 0 |
| A14 | 0.755572E−04 | 0 | 0 |
| A16 | −0.164000E−04 | 0 | 0 |

Incidentally, in the objective lens OBJ in each of Example 1-2 and Example 1-3, when calculating Δ3SA in expression (1-1), only temperature distribution and a change of refractive index caused by temperature changes were taken into consideration.

Further, in the Example 1-2, focal length f1 (mm) is 5.38 mm, optical system magnification m1 is 0, focal length f2 (mm) is 1.60 and optical system magnification m2 is 0.33, while, in the Example 3, focal length f1 (mm) is 3.89 mm, optical system magnification m1 is −0.11, focal length f2 (mm) is 1.73 and optical system magnification m2 is 0.41.

Since both objective lenses OBJ respectively in Examples 1-2 and 1-3 are designed so that the expression (1-1) may be satisfied, even when temperature in optical pickup device PU is changed in the state where temperature distribution is caused in objective lens OBJ, spherical aberration change is small, and the objective lens OBJ has sufficient power as an objective lens in the optical pickup device for a high density optical disc for which an allowable range for wavefront aberration of objective lens OBJ is severe.

Incidentally, in lens data in Tables 1-4 and 1-5, NA represents a numerical aperture, λ (nm) is a design wavelength, f (mm) represents a focal length, m represents an optical system magnification, r (mm) represents a radius of curvature, d (mm) represents a distance between surfaces, Nλ represents a refractive index in the design wavelength, and vd represents Abbe's number in d line, and an aspheric surface is expressed by the following Numeral 1 when X (mm) represents an amount of deformation from a plane that is tangent to the aspheric surface at its vertex, h (mm) represents a height in the direction perpendicular to the optical axis and r (mm) represents a radius of curvature, wherein κ represents a conic constant and $A_{2i}$ represents an aspheric surface coefficient.

The first embodiment makes it possible to obtain an optical pickup device wherein deterioration of spherical aberration is small, and stable recording/reproducing of information can be conducted for high density optical discs even when temperature in the optical pickup device is changed in the state in which uneven temperature distribution is caused in an objective lens composed of two plastic lenses.

In particular, it is possible to obtain an optical pickup device wherein an amount of change of spherical aberration in the case of temperature change in an optical pickup device is small, and stable recording/reproducing of information can be conducted for high density optical discs even when an amount of energizing for a focusing coil and a tracking coil grows great, and to obtain an optical information recording and reproducing apparatus employing the aforementioned optical pickup device.

It is further possible to obtain an objective lens that is composed of two plastic lenses to be suitable as an objective lens for an optical pickup device for high density optical discs, and is excellent in recording/reproducing, even in the case where temperature in the optical pickup device is changed in the state where uneven temperature distribution is caused in the objective lens.

Second Embodiment

In the second embodiment, "uneven temperature distribution" means that when driving an actuator (not shown) (when energizing a coil), under the assumption that T1 (° C.) represents temperature of vertex P1 of the first surface (an optical surface on the light source side of the first plastic lens L1), T2 (° C.) represents temperature of vertex P2 of the fourth surface (an optical surface on the optical recording medium side of the second plastic lens L2), and T3 (° C.), T4 (° C.), T5 (° C.) and T6 (° C.) represent temperatures respectively at points P3, P4, P5 and P6 where optional line CL that passes through the middle point of a lens thickness (thickness on an optical axis) of the first plastic lens L1 and is perpendicular to the optical axis and line CL' representing the line CL rotated by 90° intersect an outer circumference of the first flange portion FL1, and when TH represents the highest temperature among T3-T6, TL represents the lowest temperature and TC represents an average temperature of T1 and T2, if the following two conditional expressions (2-3) and (2-4) are satisfied, it is defined that "uneven temperature distribution is caused in the objective lens".

$$TP=|TH-TL|>0.5 \quad (2-3)$$

$$TR=|TH-TC|>0.5 \quad (2-4)$$

Further, "temperature distribution in the objective lens is even" means an occasion where both expressions (2-3) and (2-4) are not satisfied simultaneously.

Further, all these temperatures are assumed to be those obtained through measurement after changes of temperature distribution in the objective lens become to be the steady-state. In the present specification, "changes of temperature distribution in the objective lens become to be the steady-state" means the state wherein an absolute value of a rate of change of temperature is 0.1° C./min at all points of P1-P6.

In a plastic lens with high NA of a two-group structure, a height of passing of marginal ray of light for the first plastic lens arranged at the light source side is higher than that for the second plastic lens arranged on the optical information recording medium side. Therefore, a ray of light with NA of 0.85 is easily affected by distribution of refractive index following upon temperature distribution.

In the structure described in Item 2-1, it is possible to reduce an influence of refractive index changes following upon temperature distribution which is exerted on a ray of light with NA 0.85, by designing an objective lens so that a value of $d_1/f$ in the expression (2-1) may be less than the upper limit thereof, and therefore, it is possible to diminish astigmatism that is generated when a focusing coil and a tracking coil are energized, even in the optical pickup device employing an objective lens that is made up of a plastic lens composed of at least two groups. However, if the value of $d_1/f$ is made to be too small, sensitivity for eccentricity error between optical surfaces in the first plastic lens becomes too high. Therefore, by establishing the lower limit of $d_1/f$ to be 0.6, it is possible to reduce sensitivity for eccentricity error of the first plastic lens and thereby to enhance a rate of yield in mass production.

Next, the preferable structures in the second embodiment is explained.

The structure described in Item 2-2 is the optical pickup device according to Item 2-1, wherein the following expression (2-1') is satisfied.

$$0.6<d_1/f<0.92 \quad (2-1')$$

First, temperature distribution in the objective lens in the present specification will be defined as follows. As shown in FIGS. 5(a)-5(c), first plastic lens L1 and second plastic lens L2 both constituting objective lens OBJ have respectively first flange portion FL1 and second flange portion FL2 each being formed solidly with each optical functional portion, on the peripheral portion that is outside the optical functional portion (hatched portion in FIG. 5), and the first plastic lens L1 and the second plastic lens L2 are integrated solidly by joining a part of the first flange portion and a part of the second flange portion (joining portion M in FIG. 5(b)) together.

Incidentally, it is more preferable to make the value of $d_1/f$ to be within a range of expression (2-1').

The structure described in Item 2-3 is an optical pickup device having therein a light source that emits a light flux with wavelength λ, an objective lens made up of at least two plastic lenses including a first plastic lens having a positive refractive power and a second plastic lens having a positive refractive power and an actuator that drives the objective lens, wherein heat generated in the course of energizing the actuator makes temperature distribution in the objective lens to be uneven, and the following expression (2-2) is satisfied when f1 (mm) represents a focal length of the first plastic lens, β1 represents a magnification of the first plastic lens, f2 (mm) represents a focal length of the second plastic lens and β2 represents a magnification of the second plastic lens.

$$2.2<f1\cdot(1-\beta1)/(f2\cdot(1-\beta2))<4.2 \quad (2-2)$$

The structure described in Item 2-4 is the optical pickup device described in Item 2-3 wherein the following expression (2-2') is satisfied.

$$2.2<f1\cdot(1-\beta1)/(f2\cdot(1-\beta2))<4.0 \quad (2-2')$$

In the structure described in Item 2-3, it is possible to reduce an influence of refractive index changes following upon temperature distribution which is exerted on a ray of light with NA 0.85, by making the relationship of f1, β1, f2 and β2 to be less than the upper limit of the expression (2-2), and therefore, it is possible to diminish astigmatism that is caused by uneven temperature distribution of the plastic lens generated when a focusing coil and a tracking coil are energized, and thereby to secure a sufficient working distance which avoids an interference with an optical disc by making the relationship of f1, β1, f2 and β2 to be greater than the lower limit of the expression (2-2).

Incidentally, it is more preferable to make the relationship of f1, β1, f2 and β2 to be within a range of expression (2-2').

The structure described in Item 2-5 is the optical pickup device according to either one of Items 2-1-2-4, wherein it is possible to control astigmatism changes caused when temperature distribution in the objective lens becomes uneven in the course of energizing the actuator, when the objective lens satisfies the aforesaid expression (2-1), (2-1'), (2-2) or (2-2').

In the structure described in Item 2-5, it is possible to control astigmatism changes even when temperature distribution in the objective lens becomes uneven when energizing the actuator.

Incidentally, in the structure, as uneven temperature distribution defined with expressions (2-3) and (2-4) that causes astigmatism changes of the objective lens, there is given, for example, temperature distribution which changes in proportion to the second power of height h from an optical axis and is in non-rotational-symmetry about the optical axis.

The structure described in Item 2-6 is the optical pickup device according to either one of Items 2-1-2-5, wherein the following expressions (2-3) and (2-4) are satisfied when TP(° C.) represents temperature distribution in the circumferential direction of the objective lens in the course of energizing the actuator, and TRC(° C.) represents temperature distribution in the direction perpendicular to the optical axis.

$$TP=|TH-TL|>0.5 \qquad (2\text{-}3)$$

$$TR=|TH-TC|>0.5 \qquad (2\text{-}4)$$

The structure described in Item 2-7 is the optical pickup device according to either one of Items 2-1-2-6, wherein the following expressions (2-5) is satisfied when $d_{12}$ represents a distance between the first plastic lens and the second plastic lens on the optical axis.

$$0.1<d_{12}/f<0.4 \qquad (2\text{-}5)$$

The structure described in Item 2-8 is the optical pickup device according to either one of Items 2-1-2-7, wherein image-side numerical aperture NA of the objective lens is made to be 0.8 or more.

In the structure described in Item 2-8, the optical pickup device can be used properly for a high density optical disc with a protective layer whose thickness is about 0.1 mm employing a violet semiconductor laser with wavelength of about 400 nm and an objective lens whose image-side numerical aperture NA is about 0.85.

The structure described in Item 2-9 is the optical pickup device according to either one of Items 2-1-2-8, wherein the actuator is provided with at least a coil for focusing and a coil for tracking, and at least one of the coil for focusing and the coil for tracking is arranged so that the coil may be positioned to be closer in terms of the center of gravity to the light source than the second plastic lens.

In the structure described in Item 2-9, the two-group-structured lens is in a tendency wherein a volume of the first plastic lens is larger, and the center of gravity of the two-group-structured lens is closer to the light source than that of the second plastic lens, thus, focusing and tracking can be conducted stably by making the center of gravity of the focusing coil and that of the tracking coil to be closer to the center of gravity of the second plastic lens.

The structure described in Item 2-10 is the optical pickup device according to either one of Items 2-1-2-9, wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated solidly by joining a part of the first flange portion and a part of the second flange portion together, and when D1 (mm) represents an outside diameter of the first plastic lens including the first flange portion and D2 (mm) represents an outside diameter of the second plastic lens including the second flange portion, the following expression (2-6) is satisfied and the first plastic lens is held by a bobbin that is driven by the actuator.

$$D1>D2 \qquad (2\text{-}6)$$

In the structure described in Item 2-10, a flange is provided on the peripheral portion that is outside the optical functional portion of the plastic lens, and a two-group-structured lens is formed by joining the flanges, which is better in terms of cost and easiness of assembling a two-group-structured lens than making newly the parts for joining. Further, the optical functional portion of the first plastic lens is greater than that of the second plastic lens, and therefore, the center of gravity of the objective lens is positioned to be closer to the first plastic lens than to the second plastic lens. Therefore, by establishing a form of the first flange portion and a form of the second flange portion so that the expression (2-6) may be satisfied, and thereby, by making the first plastic lens to be held by the bobbin, focusing and tracking can be conducted stably. In this case, there is caused a trouble that uneven temperature distribution tends to be caused in the first plastic lens because the first plastic lens is arranged to be closer to the focusing coil that serves as a heat source in the course of operations of the optical pickup device. However, in the optical pickup device of the second embodiment, astigmatism originated from unevenness of temperature distribution in the objective lens can be controlled small, because the objective lens is designed so that the expression (2-1), (2-1'), (2-2) or (2-2') may be satisfied.

The structure described in Item 2-11 is the optical pickup device according to Item 2-10, wherein the following expression (2-7) is satisfied when E1 (mm) represents an effective diameter of the light-source-side optical surface of the first plastic lens.

$$0.4<E1/D1<0.65 \qquad (2\text{-}7)$$

In the structure described in Item 2-11, making E1 and D1 to be smaller than the upper limit of the expression (2-7) means that a ratio of an effective diameter to an outside diameter of the objective lens is made to be small, and unevenness of temperature distribution in the optical functional portion is reduced. In the optical pickup device of the second embodiment, therefore, astigmatism changes caused by uneven temperature distribution can be controlled effectively by satisfying expressions (2-1) and (2-7) or expressions (2-2) and (2-7). It is further possible to prevent that an outside diameter of the objective lens becomes too large.

The structure described in Item 2-12 is provided with the optical pickup device according to either one of Items 2-1-2-11, and is capable of conducting at least one of recording of information on the optical information recording medium and reproducing of information recorded on the optical information recording medium.

The structure described in Item 2-12 makes it possible to manufacture optical information recording and reproducing apparatuses having the effects in either one of Items 2-1-2-11.

The structure described in Item 2-13 is an objective lens for an optical pickup device composed of at least two of the first plastic lens having positive refracting power and the second plastic lens having positive refracting power, wherein the following expression (2-1) is satisfied when f (mm) represents a focal length of the objective lens and $d_1$ (mm) represents a distance on the optical axis between the light-source-side optical surface of the first plastic lens and the optical surface on the optical information recording medium side, and thereby, it is possible to control astigmatism changes that is cause when temperature distribution in the objective lens is made to be uneven by heat generation in the course of energizing the actuator that drives the objective lens.

$$0.6 < d_1/f < 1.2 \tag{2-1}$$

The structure described in Item 2-14 is the optical pickup device according to Item 2-13, wherein the following expression (2-1') is satisfied.

$$0.6 < d_1/f < 0.92 \tag{2-1'}$$

In the high NA plastic lens of a two-group structure, a degree of transmission of a marginal ray of light is higher in a first plastic lens arranged to be closer to a light source than in a second plastic lens arranged to be closer to a optical information recording medium. Therefore, a ray of light with NA 0.85 tends to be affected by a distribution of refractive index caused by temperature distribution in the first plastic lens.

The structure described in Item 2-12 makes it possible to reduce an influence of refractive index changes caused by temperature distribution under which the ray of light with NA 0.85 comes, by designing the objective lens so that expression (2-1) may be satisfied. Therefore, even in the optical pickup device employing an objective lens made up of a plastic lens that is composed of at least two groups, astigmatism changes on an information recording surface of an optical information recording medium in use can be controlled, and recording/reproducing of information for high density optical discs can be conducted stably.

Incidentally, it is more preferable to make an value of $d_1/f$ to be within a range of expression (2-1') in Item 2-14.

The structure described in Item 2-15 is an objective lens for optical pickup composed of at least two plastic lenses including a first plastic lens having positive refracting power and a second plastic lens having positive refracting power, wherein the following expression (2-2) is satisfied when f1 (mm) represents a focal length of the first plastic lens, β1 represents a magnification of the first plastic lens, f2 (mm) represents a focal length of the second plastic lens and β2 represents a magnification of the second plastic lens, and thereby, there are controlled astigmatism changes which are caused when temperature distribution in the objective lens is made to be uneven by heat generated in the course of energizing an actuator that drives the objective lens.

$$2.2 < f_1 \cdot (1-\beta 1)/(f_2 \cdot (1-\beta 2)) < 4.2 \tag{2-2}$$

The structure described in Item 2-16 is the objective lens according to Item 2-15, wherein the following expression (2-2') is satisfied.

$$2.2 < f_1 \cdot (1-\beta 1)/(f_2 \cdot (1-\beta 2)) < 4.0 \tag{2-2'}$$

In the structure described in Item 2-15, it is possible to reduce an influence of refractive index changes following upon temperature distribution which is exerted on a ray of light with NA 0.85, by making the relationship of f1, β1, f2 and β2 of the two-group objective lens to be less than the upper limit of the expression (2-2), and therefore, it is possible to diminish astigmatism that is caused when a focusing coil and a tracking coil are energized, and it is possible to secure a sufficient working distance by making the relationship of f1, β1, f2 and β2 of the two-group objective lens to be greater than the lower limit of the expression (2-2).

Incidentally, it is more preferable to make the relationship of f1, β1, f2 and β2 to be within a range of expression (2-2') of Item 2-16.

The structure described in Item 2-17 is the objective lens according to either one of Items 2-13-2-16, wherein the following expressions (2-3) and (2-4) are satisfied when TP(° C.) represents temperature distribution in the circumferential direction of the objective lens in the course of energizing the actuator and TR(° C.) represents temperature distribution in the direction perpendicular to the optical axis.

$$TP = |TH-TL| > 0.5 \tag{2-3}$$

$$TR = |TH-TC| > 0.5 \tag{2-4}$$

The structure described in Item 2-18 is the objective lens according to either one of Items 2-13-2-17, wherein the following expressions (2-5) is satisfied when $d_{12}$ represents a distance on the optical axis between the first plastic lens and the second plastic lens.

$$0.1 < d_{12}/f < 0.4 \tag{2-5}$$

The structure described in Item 2-19 is the objective lens according to either one of Items 2-13-2-18, wherein numerical aperture NA on the image side is made to be 0.8 or more.

In the structure described in Item 2-19, it is possible to use an objective lens for an optical pickup device properly for a high density optical disc having a protective layer with a thickness of about 0.1 mm that uses a violet semiconductor laser light source with a wavelength of about 400 nm and an objective lens with image-side numerical aperture NA of about 0.85.

The structure described in Item 2-20 is the objective lens according to either one of Items 2-13-2-19, wherein each of the first plastic lens and the second plastic lens is a meniscus that is convex toward the light source, and the following expressions (2-8) is satisfied when r1 represents a paraxial radius of curvature of the light-source-side optical surface of the second plastic lens and r2 represents a paraxial radius of curvature of the information-recording-medium-side optical surface.

$$1.0 < (r2+r1)/(r2-r1) < 1.7 \tag{2-8}$$

In the structure described in Item 2-20, each of both surfaces of the second plastic lens is made to be a meniscus that is convex toward the light source, and it is possible to correct spherical aberration caused on the optical surface on the recording medium side of the second plastic lens and coma for a ray of light outside the optical axis, by making the paraxial radius of curvature thereof to be greater than the lower limit of the expression (2-8), and it is possible to make manufacturing of the second plastic lens to be easy and to diminish deterioration of wavefront aberration caused by movement in the direction perpendicular to the optical axis of the second plastic lens, by making the paraxial radius of curvature thereof to be less than the upper limit.

The structure described in Item 2-21 is the objective lens according to either one of Items 2-13-2-20, wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated solidly by joining a part of the first flange portion and a part of the second flange portion together, and when D1 (mm) represents an outside diameter of the first plastic lens including the first flange portion and D2 (mm) represents an outside diameter of the second plastic lens including the second flange portion, the following expression (2-6) is satisfied and the first plastic lens is held by a bobbin that is driven by the actuator.

$$D1 > D2 \tag{2-6}$$

In the structure described in Item 2-21, a flange is provided on the peripheral portion that is outside the optical functional portion of the plastic lens, and a two-group-structured lens is formed by joining the flanges, which is better in terms of cost and easiness of assembling a two-group-structured lens than making newly the parts for joining. Further, the optical functional portion of the first plastic lens is greater than that of the second plastic lens, and therefore, the center of gravity of the objective lens is positioned to be closer to the first plastic lens than to the second plastic lens. Therefore, by establishing a form of the first flange portion and a form of the second flange portion so that the expression (2-6) may be satisfied, and thereby, by making the first plastic lens to be held by the bobbin, focusing and tracking can be conducted stably. In this case, there is caused a trouble that uneven temperature distribution tends to be caused in the first plastic lens because the first plastic lens is arranged to be closer to the focusing coil and the tracking coil that serve as a heat source in the course of operations of the optical pickup device. However, in the optical pickup device of the second embodiment, astigmatism changes originated from unevenness of temperature distribution in the objective lens can be controlled to be small, because the objective lens is designed so that the expression (2-1), (2-1'), (2-2) or (2-2') may be satisfied.

The structure described in Item 2-22 is the objective lens according to Item 2-21, wherein the following expression (2-7) is satisfied when E1 (mm) represents an effective diameter of the light-source-side optical surface of the first plastic lens.

$$0.4 < E1/D1 < 0.65 \tag{2-7}$$

In the structure described in Item 2-22, making E1 and D1 to be less than the upper limit of expression (2-7) means to make a ratio of an effective diameter to an outside diameter of the objective lens to be small, and unevenness of temperature distribution in an optical functional portion is lowered. In the objective lens for the optical pickup device of the second embodiment, therefore, it is possible to control effectively astigmatism changes which are caused by uneven temperature distribution, by satisfying expressions (2-1) and (2-7) or expressions (2-2) and (2-7). It is also possible to prevent that an outside diameter of the objective lens becomes too large, by making them to be larger than the lower limit.

The best mode of the second embodiment is explained.

In a detailed view in the vicinity of the objective lens OBJ shown in FIG. 3(a) and FIG. 3(b), the first plastic lens L1 is located closer to a focusing coil FC and a tracking coil TC than the second plastic lens L2.

Figure 3:
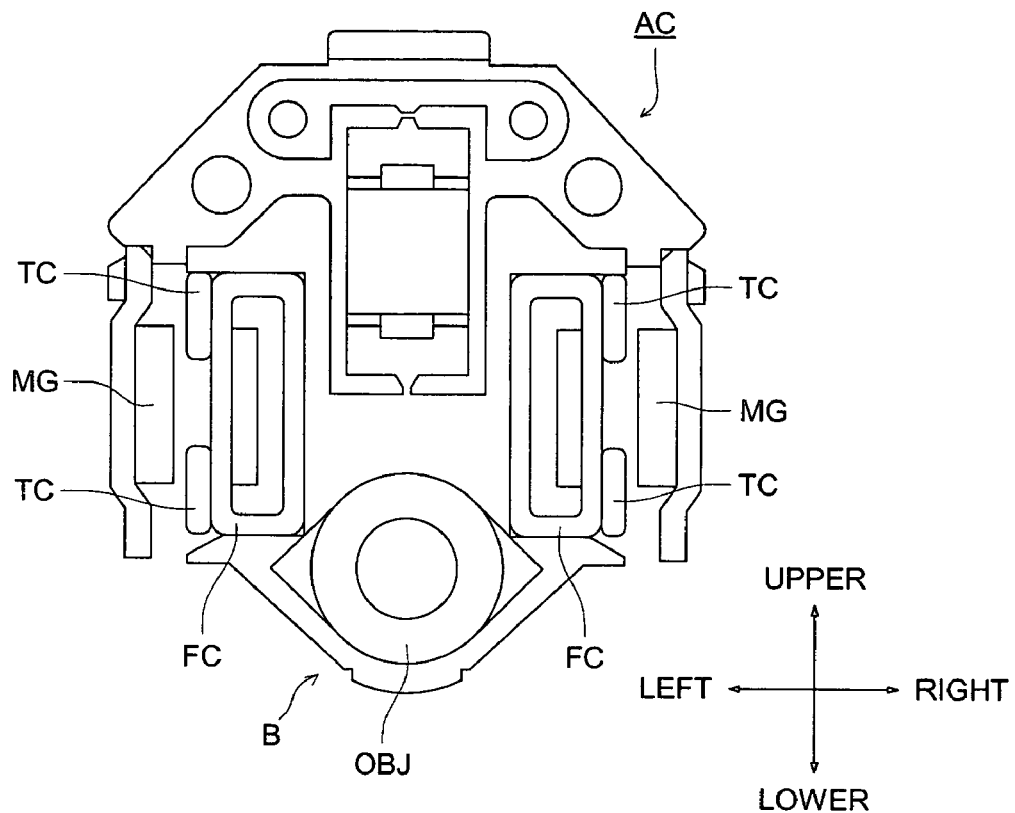
FIG. 3(a) is a top view of primary portions and FIG. 3(b) is a longitudinal sectional view of primary portions, both showing the structure of an actuator.
Figure 3:
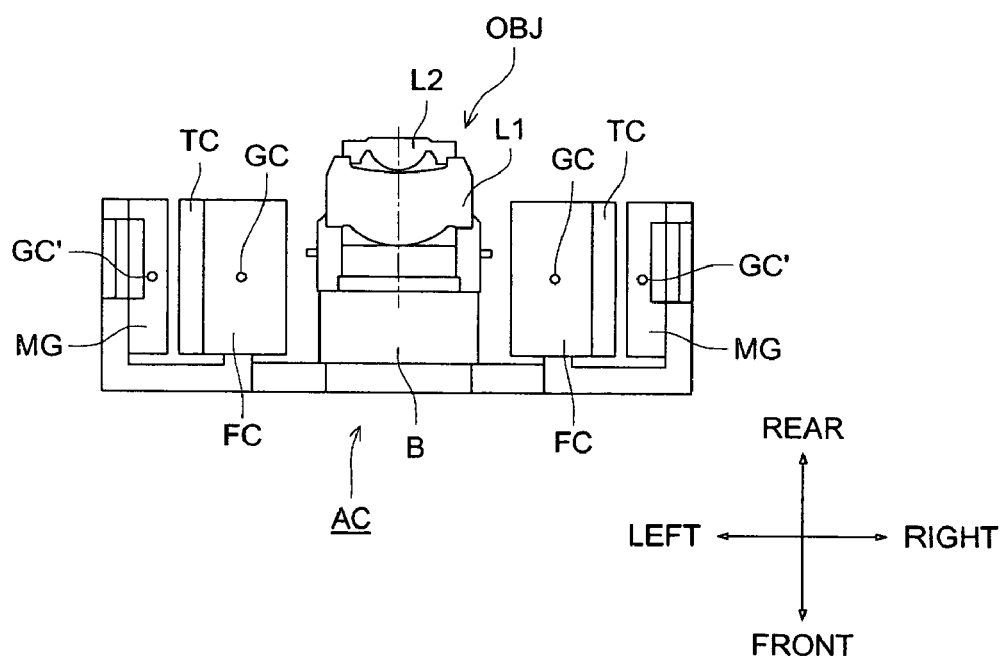

Accordingly, when an optical pickup device PU is working, the temperature of the objective lens OBJ raises in receipt of the influence of heat caused from the focusing coil FC and the tracking coil TC. As shown in FIG. 3, since the focusing coil FC and the tracking coil TC are arranged closer to the first plastic lens L1 than the second plastic lens L" and mounted asymmetrically in terms of rotation around the optical axis of the objective lens, asymmetrical temperature distribution in terms of rotation around the optical axis is caused in the objective lens OBJ (especially, in the first plastic lens).

However, in the optical pickup device PU of the second embodiment, astigmatism changes originated from unevenness of temperature distribution in the objective lens can be controlled to be small, because the objective lens is designed so that the expression (2-1), (2-1'), (2-2) or (2-2') may be satisfied. As a result, recording/reproducing information can be conducted stably for a high density optical disk OD.

In this connection, it may be preferable to design the first plastic lens L1 and the second plastic lens L2 so as to satisfy the expressions (2-6) and (2-7), when E1 represents an effective diameter of a light source side optical surface of the first plastic lens L1, D1 is an outer diameter of the first plastic lens L1, and D2 is an outer diameter of the first plastic lens L2.

Further, in the objective lens in this embodiment, each of the first plastic lens L1 and the second plastic lens L2 is a meniscus lens being convex toward a violet semiconductor laser side. Generally, in an objective lens which is structure in two groups with a high NA and is made of a plastic, if its shape is designed so as to be smaller than the lower limit of the expression (2-8), when a light flux having an angle of view comes into the objective lens, coma aberration generated in the final place (an optical surface closest to an optical information recording medium) become larger. As a result, an allowable difference in the positional adjustment for the light source becomes more severe. On the other hand, if its shape is designed so as to be smaller than the upper limit of the expression (2-8), the deviation of the second plastic lens in a direction vertical to the optical axis, that is, an assembling process for two plastic lens becomes more severe. However, when the second plastic lens is a meniscus lens being convex toward the violet semiconductor laser side and is designed so as to satisfy the expression (2-8), the generation of a comma aberration can reduced and an allowable difference for the accuracy in the positional adjustment for the light source and the assembling process of the objective lens can be eased.

Further, although an illustration is omitted, it becomes possible to obtain the abovementioned optical pickup device, a rotating driving device to hold rotationally an optical information recording medium and an optical information recording reproducing apparatus which incorporates an control device to control driving various types of devices and can conduct at least one of recording optical information for an optical information recording medium OD and reproducing information recorded in the optical information recording medium OD.

Next, an objective lens suitable as the aforesaid objective lens will be explained. First, lenses designed to satisfy the expressions (2-1), (2-1'), (2-2) or (2-2') are shown in Tables 2-3 as Examples 2-3, and an objective lens designed not to satisfy expressions (2-1), (2-1'), (2-2) and (2-2') is shown in Table 2-4 as a comparative example. Values of the expressions for the Examples 1-3 and the Comparative Example are shown in Table 2-5.

TABLE 2-1

Example 2-1
NA = 0.85, λ = 405 nm, f = 1.765 mm, m = 0

Paraxial data

| Surface No. | r (mm) | d (mm) | Nλ | νd | Δn/ΔT | Remarks |
|---|---|---|---|---|---|---|
| 0 | — | ∞ | — | — | | Light source |
| 1 | 1.8388 | 1.20 | 1.5247 | 56.4 | −1.1E−04 | First plastic lens |
| 2 | 10.2387 | 0.05 | | | | |
| 3 | 1.2476 | 1.63 | 1.5247 | 56.4 | −1.1E−04 | Second plastic lens |
| 4 | 3156.6018 | 0.22 | | | | |

TABLE 2-1-continued

Example 2-1
NA = 0.85, λ = 405 nm, f = 1.765 mm, m = 0

| Surface | r | d | Nλ | vd | Remarks |
|---|---|---|---|---|---|
| 5 | ∞ | 0.10 | 1.6195 | 30.0 | Protective layer |
| 6 | ∞ | — | — | — | |

Aspheric surface coefficient

| | First surface | Second surface | Third surface |
|---|---|---|---|
| κ | −2.0085E−01 | 2.2603E+01 | −1.1930E+00 |
| A4 | 1.5590E−04 | 1.7258E−02 | 7.3227E−02 |
| A6 | −4.8620E−03 | −2.7840E−02 | 1.2770E−02 |
| A8 | 4.7230E−04 | 2.8469E−02 | 7.9840E−03 |
| A10 | 1.4866E−03 | −1.3370E−02 | −2.1255E−04 |
| A12 | −1.1240E−03 | 1.9470E−03 | 0.0000E+00 |
| A14 | 3.5580E−04 | 0.0000E+00 | 0.0000E+00 |
| A16 | −6.9900E−05 | 0.0000E+00 | 0.0000E+00 |

TABLE 2-2

Example 2-2
NA = 0.85, λ = 405 nm, f = 1.765 mm, m = 0

Paraxial data

| Surface No. | r (mm) | d (mm) | Nλ | vd | Δn/ΔT | Remarks |
|---|---|---|---|---|---|---|
| 0 | — | ∞ | — | — | | Light source |
| 1 | 1.8640 | 1.83 | 1.5247 | 56.4 | −1.1E−04 | First plastic lens |
| 2 | 7.7564 | 0.05 | | | | |
| 3 | 1.0032 | 1.26 | 1.5247 | 56.4 | −1.1E−04 | Second plastic lens |
| 4 | 8.9979 | 0.24 | | | | |
| 5 | ∞ | 0.10 | 1.6195 | 30.0 | | Protective layer |
| 6 | ∞ | — | — | — | | |

Aspheric surface coefficient

| | First surface | Second surface | Third surface |
|---|---|---|---|
| κ | −2.2130E−01 | 7.0328E+00 | −8.6402E−01 |
| A4 | −2.1846E−03 | 2.2052E−01 | 1.0103E−01 |
| A6 | −9.5322E−04 | −2.2281E−02 | 3.8530E−02 |
| A8 | −7.7285E−04 | 2.4090E−02 | 1.8246E−02 |
| A10 | 9.3317E−04 | −1.7744E−02 | 2.8938E−02 |
| A12 | −8.4617E−04 | 3.7710E−03 | 0.0000E+00 |
| A14 | 3.1866E−04 | 0.0000E+00 | 0.0000E+00 |
| A16 | −5.6885E−05 | 0.0000E+00 | 0.0000E+00 |

TABLE 2-3

Example 2-3
NA = 0.85, λ = 405 nm, f = 1.765 mm, m = 0

Paraxial data

| Surface No. | r (mm) | d (mm) | Nλ | vd | Δn/ΔT | Remarks |
|---|---|---|---|---|---|---|
| 0 | — | ∞ | — | — | | Light source |
| 1 | 1.5934 | 1.10 | 1.5247 | 56.4 | −1.1E−04 | First plastic lens |
| 2 | 8.2529 | 0.60 | | | | |
| 3 | 1.0902 | 1.10 | 1.5247 | 56.4 | −1.1E−04 | Second plastic lens |
| 4 | ∞ | 0.26 | | | | |
| 5 | ∞ | 0.10 | 1.6195 | 30.0 | | Protective layer |
| 6 | ∞ | — | — | — | | |

TABLE 2-3-continued

Example 2-3
NA = 0.85, λ = 405 nm, f = 1.765 mm, m = 0

Aspheric surface coefficient

| | First surface | Second surface | Third surface |
|---|---|---|---|
| κ | −1.4359E−01 | 2.5532E+01 | −1.0505E−01 |
| A4 | −6.8232E−03 | 8.0373E−03 | −2.3969E−03 |
| A6 | −2.5111E−04 | −2.3113E−03 | −5.5209E−02 |
| A8 | −1.3788E−03 | 2.7676E−04 | 4.9216E−02 |
| A10 | −3.7312E−04 | −2.1956E−03 | −4.3551E−02 |
| A12 | −4.5130E−06 | 4.6510E−04 | 0.0000E+00 |
| A14 | 3.0537E−08 | 0.0000E+00 | 0.0000E+00 |
| A16 | −4.4887E−05 | 0.0000E+00 | 0.0000E+00 |

TABLE 2-4

Comparative Example 2
NA = 0.85, λ = 405 nm, f = 1.765 mm, m = 0

Paraxial data

| Surface No. | r (mm) | d (mm) | Nλ | vd | Δn/ΔT | Remarks |
|---|---|---|---|---|---|---|
| 0 | — | ∞ | — | — | | Light source |
| 1 | 2.0966 | 2.50 | 1.5247 | 56.4 | −1.1E−04 | First plastic lens |
| 2 | 6.2900 | 0.05 | | | | |
| 3 | 0.8880 | 1.10 | 1.5601 | 56.7 | −9.0E−05 | Second plastic lens |
| 4 | ∞ | 0.26 | | | | |
| 5 | ∞ | 0.10 | 1.6195 | 30.0 | | Protective layer |
| 6 | ∞ | — | — | — | | |

Aspheric surface coefficient

| | First surface | Second surface | Third surface |
|---|---|---|---|
| κ | −1.6811E−01 | 4.8625E+00 | −8.0927E−01 |
| A4 | −4.6830E−03 | −2.2200E−03 | 1.1694E−01 |
| A6 | 6.1110E−04 | 1.7541E−02 | 2.8874E−02 |
| A8 | −9.4700E−04 | −9.5100E−03 | 1.2745E−01 |
| A10 | 2.3380E−04 | −1.7950E−02 | −8.7730E−02 |
| A12 | −1.5600E−04 | 8.9880E−03 | 0.0000E+00 |
| A14 | 6.6400E−05 | 0.0000E+00 | 0.0000E+00 |
| A16 | −1.8900E−05 | 0.0000E+00 | 0.0000E+00 |

TABLE 2-5

Values of expressions in Examples and Comparative Example

| | Example 1 | Example 2 | Example 3 | Comparative Example |
|---|---|---|---|---|
| f | 1.765 | 1.765 | 1.765 | 1.765 |
| NA | 0.85 | 0.85 | 0.85 | 0.85 |
| f1 | 4.07 | 4.22 | 3.56 | 4.97 |
| f2 | 2.38 | 2.04 | 2.08 | 1.59 |
| β1 | 0 | 0 | 0 | 0 |
| β2 | 0.43 | 0.42 | 0.5 | 0.35 |
| D1 | 4.8 | 4.8 | 4.8 | 4.2 |
| D2 | 3.8 | 3.8 | 3.8 | 3.3 |
| E1 | 3.0 | 3.0 | 3.0 | 3.0 |
| Expression (2-1) | 0.68 | 1.04 | 0.62 | 1.42 |
| Expression (2-2) | 3.02 | 3.55 | 3.4 | 4.86 |
| Expression (2-6) | 0.63 | 0.63 | 0.63 | 0.71 |
| Expression (2-7) | 1 | 1.25 | 1 | 1 |

TABLE 2-5-continued

Values of expressions in Examples and Comparative Example

| | Example 1 | Example 2 | Example 3 | Comparative Example |
|---|---|---|---|---|
| Expression (2-8) | 0.03 | 0.03 | 0.34 | 0.03 |

$$0.6 < d_1/f < 1.3 \quad (2\text{-}1)$$

$$2.2 < f_1 \cdot (1-\beta 1)/(f_2 \cdot (1-\beta 2)) < 4.4. \quad (2\text{-}2)$$

$$0.4 < E1/D1 < 0.6 \quad (2\text{-}6)$$

$$1.0 < (r2+r1)/(r2-r1) < 1.7 \quad (2\text{-}7)$$

$$d_{12}/f \quad (2\text{-}8)$$

In the Tables 2-1-2-4, NA represents a numerical aperture, λ (nm) represents a design wavelength, f (mm) represents a focal length, m represents a magnification of the total objective lens system, r (mm) represents a radius of curvature, n represents a refractive index at 25° C. for the design wavelength, νd represents Abbe's number in d line and Δn/ΔT (1/° C.) represents temperature-dependence of the refractive index of the plastic lens, and an aspheric surface is expressed by abovementioned Numeral 1 when X (mm) represents an amount of change from a plane that is tangential to the aspheric surface at its vertex, h (mm) represents a height in the direction perpendicular to the optical axis and r (mm) represents a radius of curvature, wherein κ represents a conic constant and $A_{2i}$ represents an aspheric surface coefficient.

Next, there will be explained a simulation method for astigmatism changes in the case where temperature distribution that is non-rotational-symmetry about the optical axis is generated in a lens for objective lenses in the aforesaid Examples 2-1-2-3 and Comparative Example 2.

Temperature distribution caused in a plastic lens can be described by replacing with refractive index distribution. In FIG. 5(b), under the assumption that huge heat sinks (each corresponding to a coil in operation of optical pickup device PU) are present at the upper side and the lower side (outside of P3 and P4) of objective lens OBJ, refractive index distribution $N_1$ (h) generated in the first plastic lens L1 and refractive index distribution $N_2$ (h) generated in the second plastic lens L2 are expressed by the following expressions, as a function of h representing a height from an optical axis in the direction running parallel to CL.

$$N_1(h) = N_{01} + N_{h1} \cdot h^2 \quad (A)$$

$$N_2(h) = N_{02} + N_{h2} \cdot h^2 \quad (B)$$

In this case, $N_{01}$ and $N_{02}$ are refractive indexes (equivalent to n in Tables 2-1-2-3) respectively of the first plastic lens L1 and the second plastic lens L2 in a plane (h=0) including CL' and an optical axis, while, each of $N_{h1}$ and $N_{h2}$ is a rate of refractive index change for height h from an optical axis in each of the first plastic lens L1 and the second plastic lens L2, and its sign is negative.

Namely, refractive index distribution (temperature distribution) expressed by each of expressions (A) and (B) is a distribution wherein the refractive index (temperature) in each of the first plastic lens L1 and the second plastic lens L2 becomes smaller (higher) in proportion to the second power of height h from an optical axis.

Incidentally, since refractive index distribution in each of the first plastic lens L1 and the second plastic lens L2 on a plane (h=0) including CL' and an optical axis is uniform, all of T1, T2, T5 and T6 representing temperatures respectively of P1, P2, P5 and P6 in FIG. 5 are the same.

Therefore, TH in each of the expressions (2-3) and (2-4) is the same as T3 and T4 representing temperatures at P3 and P4, TL is the same as each of T5 and T6 representing respectively temperatures at P5 and P6, and TC is the same as each of T1 and T2 representing respectively temperatures at P1 and P2.

Figure 7:
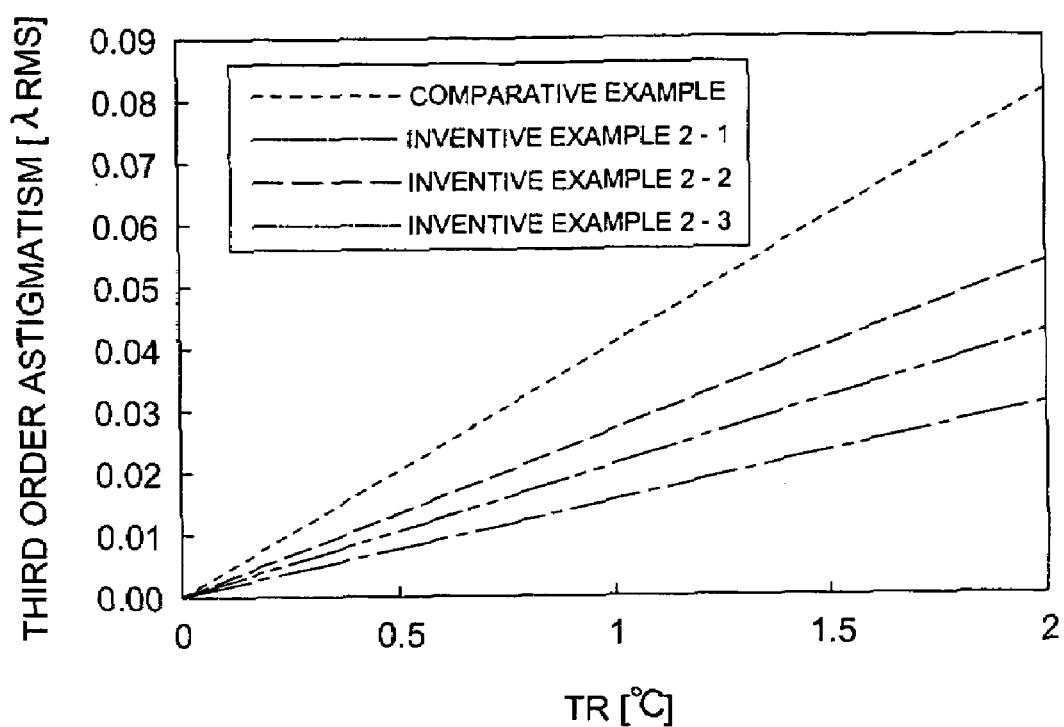
FIG. 7 shows graphs showing a relationship between TR and astigmatism in an objective lens in Inventive Examples 2-1 to 2-3 and Comparative Example.

In FIG. 7, the axis of abscissas represents a difference (=TR) between each of T3 and T4 representing temperatures at P3 and P4 and a temperature (=T1=T2=T5=T6) in a plane (h=0) including CL' and an optical axis, and tertiary astigmatism for each temperature difference is plotted, in connection with objective lenses in Examples 1-3 and Comparative Example, in the model of refractive index distribution as stated above.

Incidentally, in the model of refractive index distribution in the present simulation, temperature distribution TP in the circumferential direction is the same as temperature distribution TR in the direction perpendicular to the optical axis.

FIG. 7 shows that an amount of tertiary astigmatism generated is reduced in the Examples 2-1-2-3 where expressions (2-1) and (2-2) are satisfied, compared with Comparative Example where there is generated tertiary astigmatism wherein an amount of generated astigmatism exceeds 0.07 λRMS representing Marechal's criterion under the condition that TR is 2° C.

In particular, in Example 2-3 wherein expressions (2-1)', (2-2)' and (2-8) are satisfied, an amount of tertiary astigmatism generated is reduced to a half or less, compared with Comparative Example.

Incidentally, with regard to expressions (A) and (B), specific numerical values in Example 1 are as follows. Since temperature-dependency Δn/ΔT of refractive index of the first plastic lens L1 is −1.1E−4, when TR is 2° C., refractive index $N_1$ (h=2.4) at P3 and P4 (h=2.4) is 1.5247−1.1E−4× 2=1.52448.

Therefore, rate of change of refractive index $N_{h1}$ for height h from the optical axis turns out to be $N_{h1}$=−3.82E−5 from 1.52448=1.5247+$N_{h1}$·2.42.

After calculation of the second plastic lens L2 in the same way as in the foregoing, temperature-dependency Δn/ΔT of refractive index of the second plastic lens L2 is $N_{h2}$=−3.82E−5, because it is the same as that of the first plastic lens L1.

Judging from the foregoing, it is possible to state positively that each of objective lenses in Examples 2-1, 2-2 and 2-3 is one wherein an amount of changes of astigmatism is controlled to be small even when uneven temperature distribution is caused in the objective lens by heat generated in an actuator, by satisfying expression (2-1), (2-1'), (2-2) or (2-2'), and sufficient properties as an objective lens of an optical pickup device for high density optical discs are provided.

The second embodiment makes it possible to obtain an optical pickup device wherein an amount of changes of astigmatism is small in the case where temperature distribution that is non-rotational-symmetry about an optical axis is generated in the objective lens composed of two plastic lenses, and to obtain an optical information recording and reproducing apparatus employing the aforementioned optical pickup device.

It is further possible to obtain an objective lens that is composed of two plastic lenses, and is suitable as an objective lens used in an optical pickup device for high density optical discs, wherein changes of astigmatism are small and operations of recording/reproducing are excellent even when uneven temperature distribution is caused in the objective lens.

What is claimed is:

1. An objective lens for use in an optical pickup device, comprising:

at least two plastic lenses of a first plastic lens having positive refractive power and a second plastic lens having positive refractive power, wherein the first plastic lens and the second plastic lens are arranged in this order from the light source side;

wherein the objective lens satisfies the following expression (1-1):

$$-0.0004 < \Delta 3SA/(NA^4 \cdot f \cdot (1-m)) < 0.0004 \qquad (1\text{-}1)$$

where $\Delta 3SA$ ($\lambda RMS$) represents a rate of change of a third order spherical aberration of the objective lens when the temperature of an entire body of the objective lens uniformly changes, f (mm) represents the focal length of the objective lens for the light flux having wavelength $\lambda$, and m represents the magnification of the objective lens.

2. The objective lens of claim 1, wherein the objective lens satisfies the following expression (1-7):

$$-0.0003 < \Delta 3SA/(NA^4 \cdot f \cdot (1-m)) < 0.0003 \qquad (1\text{-}7).$$

3. The objective lens of claim 1, wherein at least one of the followings expressions is satisfied:

$$|TA| > 1.0,$$

$$|TR1| > 0.3$$

$$|TR2| > 0.3$$

where TA (° C.) represents temperature distribution in the optical axis direction of the objective lens and each of TR1 (° C.) and TR2 (° C.) represents temperature distribution in the radial direction when the actuator is energized, and TA, TR1 and TR2 are defined by the following expressions:

$$TA = T1 - T2(° C.)$$

$$TR1 = (T3 + T4 + T5 + T6)/4 - T1(° C.)$$

$$TR2 = (T3 + T4 + T5 + T6)/4 - T2(° C.)$$

where when the actuator is energized, T1 (° C.) represents temperature on a vertex of a light source side optical surface of the first plastic lens), T2 (° C.) represents temperature on a vertex of an optical disc side surface the second plastic lens, T3 (° C.), T4 (° C.), T5 (° C.) and T6 (° C.) represent temperatures respectively at points where a first line which passes through a middle point of a lens thickness of the first plastic lens on an optical axis and is perpendicular to the optical axis and lines which representing lines obtained by rotating the fist line by 90° around the optical axis intersect with an outer circumference of the first plastic lens and T1 to T6 are measured after the temperature distribution fluctuation in the objective lens becomes a stable condition when the actuator is energized.

4. The objective lens of claim 1, wherein the numerical aperture NA on the image side of the objective lens is 0.8 or more.

5. The objective lens of claim 1, wherein the following expressions (1-2)-(1-4) are satisfied:

$$-20 \times 10^{-5}/° C. < \Delta NL1 < -2 \times 10^{-5}/° C. \qquad (1\text{-}2)$$

$$0.6 < \Delta NL2/\Delta NL1 < 1.5 \qquad (1\text{-}3)$$

$$0.1 < (\Delta NL2/\Delta NL1) \cdot fB/(f \cdot (1-m)) < 0.2 \qquad (1\text{-}4)$$

where $\Delta NL1$ represents a rate of change of refractive index of the first plastic lens for temperature changes, $\Delta NL2$ represents a rate of change of refractive index of the second plastic lens for temperature changes, and fB (mm) represents a back focus of the objective lens.

6. The objective lens of claim 5, wherein the following expressions (1-8)-(1-10) are satisfied:

$$-15 \times 10^{-5}/° C. < \Delta NL1 < -5 \times 10^{-5}/° C. \qquad (1\text{-}8)$$

$$0.7 < \Delta NL2/\Delta NL1 < 1.4 \qquad (1\text{-}9)$$

$$0.12 < (\Delta NL2/\Delta NL1) \cdot fB/(f \cdot (1-m)) < 0.18 \qquad (1\text{-}10).$$

7. The objective lens of claim 1, wherein the following expression (1-5) is satisfied:

$$3.5 < f1 \cdot (1-m1)/(f2 \cdot (1-m)) < 5.8 \qquad (1\text{-}5)$$

where f1 (mm) represents a focal length of the first plastic lens for the light flux having wavelength $\lambda$, m1 represents an optical system magnification of the first plastic lens, f2 (mm) represents a focal length of the second plastic lens for the light flux having wavelength $\lambda$, and m2 represents an optical system magnification of the second plastic lens.

8. The objective lens of claim 1, wherein the second plastic lens is a meniscus lens that is convex toward the first plastic lens.

9. The objective lens of claim 1, wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated into one body by bringing a part of the first flange portion and a part of the second flange portion in contact with each other, and wherein the following expression (1-6) is satisfied and the first plastic lens is held by a bobbin that is driven by the actuator:

$$D1 > D2 \qquad (1\text{-}6)$$

where D1 (mm) represents an outside diameter of the first plastic lens including the first flange portion and D2 (mm) represents an outside diameter of the second plastic lens including the second flange portion.

10. An objective lens for use in an optical pickup device, comprising:

at least two plastic lenses of a first plastic lens having positive refractive power and a second plastic lens having positive refractive power, wherein the first plastic lens and the second plastic lens are arranged in this order from the light source side;

wherein the following expression (2-1) is satisfied:

$$0.6 < d_1/f < 1.2 \qquad (2\text{-}1)$$

where f (mm) represents a focal length of the objective lens for the light flux having wavelength $\lambda$, and $d_1$ (mm) represents a distance between a light source-side optical surface of the first plastic lens and an optical information recording medium-side optical surface the first plastic lens on the optical axis.

11. The objective lens of claim 10, wherein the following expression (2-1') is satisfied $$0.6 < d_1/f < 0.92 \qquad (2\text{-}1').$$

12. The objective lens of claim 10, wherein the following expressions (2-3) and (2-4) are satisfied:

$$TP = |TH - TL| > 0.5 \qquad (2\text{-}3)$$

$$TR = |TH - TC| > 0.5 \qquad (2\text{-}4)$$

where TP(° C.) represents temperature distribution in the circumferential direction of the objective lens in the course of energizing the actuator, and TR(° C.) represents temperature distribution in the direction perpendicular to the optical axis, and when T1 (° C.) represents temperature on a vertex of a light source side optical surface of the first plastic lens), T2 (° C.) represents temperature on a vertex of an optical disc side surface the second plastic lens, T3 (° C.), T4 (° C.), T5 (° C.) and T6 (° C.) represent temperatures respectively at points where a first line which passes through a middle point of a lens thickness of the first plastic lens on an optical axis and is perpendicular to the optical axis and lines which representing lines obtained by rotating the fist line by 90° around the optical axis intersect with an outer circumference of the first plastic lens and T1 to T6 are measured after the temperature distribution fluctuation in the objective lens becomes a stable condition when the actuator is energized, TH represents the highest temperature and TL is the lowest temperature among T3 o T6 and TC is an average temperature of T1 and T2.

13. The objective lens of claim 10, wherein the following expressions (2-5) is satisfied:

$$0.1 < d_{12}/f < 0.4 \qquad (2\text{-}5)$$

where $d_{12}$ represents a distance between the first plastic lens and the second plastic lens on the optical axis.

14. The objective lens of claim 10, wherein the numerical aperture NA on the image side of the objective lens is 0.8 or more.

15. The objective lens of claim 10, wherein the following expressions (2-8) is satisfied:

$$1.0 < (r2+r1)/(r2-r1) < 1.7 \qquad (2\text{-}8)$$

where r1 represents a paraxial radius of curvature of the light-source-side optical surface of the second plastic lens and r2 represents a paraxial radius of curvature of the information-recording-medium-side optical surface.

16. The objective lens of claim 10, wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated into one body by bringing a part of the first flange portion and a part of the second flange portion in contact with each other, and wherein the following expression (1-6) is satisfied and the first plastic lens is held by a bobbin that is driven by the actuator:

$$D1 > D2 \qquad (2\text{-}6)$$

where D1 (mm) represents an outside diameter of the first plastic lens including the first flange portion and D2 (mm) represents an outside diameter of the second plastic lens including the second flange portion.

17. The objective lens of claim 16, wherein the following expression (1-6) is satisfied:

$$0.4 < E1/D1 < 0.65 \qquad (2\text{-}7)$$

where E1 (mm) represents an effective diameter of the light-source-side optical surface of the first plastic lens.

18. An objective lens for use in an optical pickup device, comprising:

at least two plastic lenses of a first plastic lens having positive refractive power and a second plastic lens having positive refractive power, wherein the first plastic lens and the second plastic lens are arranged in this order from the light source side;

wherein the following expression (2-2) is satisfied:

$$2.2 < f1 \cdot (1-\beta 1)/(f2 \cdot (1-\beta 2)) < 4.2 \qquad (2\text{-}2)$$

where f1 (mm) represents a focal length of the first plastic lens for the light flux having wavelength λ, β1 represents a magnification of the first plastic lens, f2 (mm) represents a focal length of the second plastic lens for the light flux having wavelength λ and β2 represents a magnification of the second plastic lens.

19. The objective lens of claim 18, wherein the following expression (2-2') is satisfied.

$$2.2 < f1 \cdot (1-\beta 1)/(f2 \cdot (1-\beta 2)) < 4.0 \qquad (2\text{-}2').$$

20. The objective lens of claim 18, wherein the following expressions (2-3) and (2-4) are satisfied:

$$TP = |TH - TL| > 0.5 \qquad (2\text{-}3)$$

$$TR = |TH - TC| > 0.5 \qquad (2\text{-}4)$$

where TP(° C.) represents temperature distribution in the circumferential direction of the objective lens in the course of energizing the actuator, and TRC(° C.) represents temperature distribution in the direction perpendicular to the optical axis, and when T1 (° C.) represents temperature on a vertex of a light source side optical surface of the first plastic lens L1), T2 (° C.) represents temperature on a vertex of an optical disc side surface the second plastic lens, T3 (° C.), T4 (° C.), T5 (° C.) and T6 (° C.) represent temperatures respectively at points where a first line which passes through a middle point of a lens thickness of the first plastic lens on an optical axis and is perpendicular to the optical axis and lines which representing lines obtained by rotating the fist line by 90° around the optical axis intersect with an outer circumference of the first plastic lens and T1 to T6 are measured after the temperature distribution fluctuation in the objective lens becomes a stable condition when the actuator is energized, TH represents the highest temperature and TL is the lowest temperature among T3 o T6 and TC is an average temperature of T1 and T2.

21. The objective lens of claim 18, wherein the following expressions (2-5) is satisfied:

$$0.1 < d_{12}/f < 0.4 \qquad (2\text{-}5)$$

where $d_{12}$ represents a distance between the first plastic lens and the second plastic lens on the optical axis.

22. The objective lens of claim 18, wherein the numerical aperture NA on the image side of the objective lens is 0.8 or more.

23. The objective lens of claim 18, wherein the following expressions (2-8) is satisfied:

$$1.0 < (r2+r1)/(r2-r1) < 1.7 \qquad (2\text{-}8)$$

where r1 represents a paraxial radius of curvature of the light-source-side optical surface of the second plastic lens and r2 represents a paraxial radius of curvature of the information-recording-medium-side optical surface.

24. The objective lens of claim 18, wherein the first plastic lens has a first flange portion on a peripheral portion that is outside the optical functional portion and the second plastic lens has a second flange portion on a peripheral portion that is outside the optical functional portion, and the first plastic lens and the second plastic lens are integrated into one body by bringing a part of the first flange portion and a part of the second flange portion in contact with each other, and wherein the following expression (1-6) is satisfied and the first plastic lens is held by a bobbin that is driven by the actuator:

$$D1 > D2 \tag{2-6}$$

where D1 (mm) represents an outside diameter of the first plastic lens including the first flange portion and D2 (mm) represents an outside diameter of the second plastic lens including the second flange portion.

25. The objective lens of claim 24, wherein the following expression (1-6) is satisfied:

$$0.4 < E1/D1 < 0.65 \tag{2-7}$$

where E1 (mm) represents an effective diameter of the light-source-side optical surface of the first plastic lens.

* * * * *